US010031658B2

(12) United States Patent
Ryu

(10) Patent No.: US 10,031,658 B2
(45) Date of Patent: Jul. 24, 2018

(54) MOBILE TERMINAL HAVING INTELLIGENT SCROLL BAR

(71) Applicant: LG ELECTRONICS INC., Seoul (KR)

(72) Inventor: Hosun Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 520 days.

(21) Appl. No.: 14/176,913

(22) Filed: Feb. 10, 2014

(65) Prior Publication Data

US 2014/0237419 A1   Aug. 21, 2014

(30) Foreign Application Priority Data

Feb. 20, 2013   (KR) .......................... 10-2013-0018047

(51) Int. Cl.
*G06F 3/00*   (2006.01)
*G06F 9/00*   (2006.01)
(Continued)

(52) U.S. Cl.
CPC ...... *G06F 3/04855* (2013.01); *G06F 3/04817* (2013.01); *G11B 27/105* (2013.01); *G11B 27/34* (2013.01); *H04M 2250/22* (2013.01)

(58) Field of Classification Search
CPC .............. G06F 3/04855; G06F 3/04817; G06F 9/4445; G06F 3/1462; G06F 3/0484;
(Continued)

(56) References Cited

U.S. PATENT DOCUMENTS 5,623,588 A *   4/1997   Gould ................. G06F 3/04855
                                                    345/157
6,738,084 B1 *   5/2004   Kelley ................. G06F 3/0481
                                                    715/784
(Continued)

FOREIGN PATENT DOCUMENTS

CN   101853122 A   10/2010
CN   102043434 A   5/2011
CN   102714514 A   10/2012

OTHER PUBLICATIONS

Guiard et al., "Object Pointing: A Complement to Bitmap Pointing in GUIs", GI'04 Proceedings of Graphics Interface 2004, Jan. 1, 2004, pp. 9-16.
(Continued)

*Primary Examiner* — Kieu Vu
*Assistant Examiner* — Anita D Chaudhuri
(74) *Attorney, Agent, or Firm* — Birch, Stewart, Kolasch & Birch, LLP

(57) ABSTRACT

A mobile terminal including a wireless communication unit configured to perform wireless communication; a touchscreen configured to display content; and a controller configured to display a scroll bar on the touchscreen for adjusting an output location of the content, display at least one marker on the scroll bar to indicate a specific output location of the content, receive a selection signal indicating a pointer touches a first point of the scroll bar and moves in a prescribed direction, and change the output location of the content into an output location indicated by a corresponding marker located closest to the first point in the prescribed direction from the first point.

16 Claims, 28 Drawing Sheets

(51) Int. Cl.
  *G06F 17/00*   (2006.01)
  *G06F 3/0485*  (2013.01)
  *G06F 3/0481*  (2013.01)
  *G11B 27/10*   (2006.01)
  *G11B 27/34*   (2006.01)

(58) Field of Classification Search
  CPC ........ G06F 9/4443; G06F 8/34; G06F 3/0486;
          G06F 8/38; G06F 3/0481; G06F 3/0482;
          G06F 3/04812; G06F 3/04847; G06Q
          10/10; H04L 67/38; H04N 1/00389;
          G11B 27/105; G11B 27/34
  See application file for complete search history.

(56) References Cited

U.S. PATENT DOCUMENTS

| | | | | |
|---|---|---|---|---|
| 7,328,411 | B2* | 2/2008 | Satanek | G06F 3/04855 715/786 |
| 8,196,061 | B1* | 6/2012 | Bhojan | G06F 3/0483 715/787 |
| 8,381,126 | B2* | 2/2013 | Gould | G06F 3/04855 345/607 |
| 2002/0109728 | A1* | 8/2002 | Tiongson | G06F 3/04855 715/786 |
| 2002/0145631 | A1* | 10/2002 | Arbab | G06F 3/04855 715/786 |
| 2002/0186252 | A1 | 12/2002 | Himmel et al. | |
| 2003/0048280 | A1* | 3/2003 | Russell | G06F 3/017 345/619 |
| 2007/0177780 | A1* | 8/2007 | Chui | G06F 19/321 382/128 |
| 2008/0158261 | A1 | 7/2008 | Gould | |
| 2010/0245267 | A1 | 9/2010 | Min et al. | |
| 2011/0047503 | A1* | 2/2011 | Allen, Jr. | G06F 3/0485 715/784 |
| 2011/0167347 | A1 | 7/2011 | Joo et al. | |
| 2011/0320976 | A1 | 12/2011 | Piersol et al. | |
| 2012/0030614 | A1* | 2/2012 | Tuli | G06F 3/04855 715/786 |
| 2012/0054606 | A1* | 3/2012 | Terayoko | G09G 5/34 715/273 |
| 2012/0136737 | A1* | 5/2012 | Lippolis | G06F 3/0485 705/23 |
| 2012/0179967 | A1 | 7/2012 | Hayes et al. | |
| 2012/0272181 | A1* | 10/2012 | Rogers | G06F 3/0482 715/784 |
| 2013/0328788 | A1* | 12/2013 | Wibbeler | G06F 3/0488 345/173 |

OTHER PUBLICATIONS

IP.COM Journal, IP.COM Inc., "System and Method for Scroll Bar Marking & Sectioning", Dec. 17, 2007, XP013123187, 8 pages.

* cited by examiner

FIG. 7
 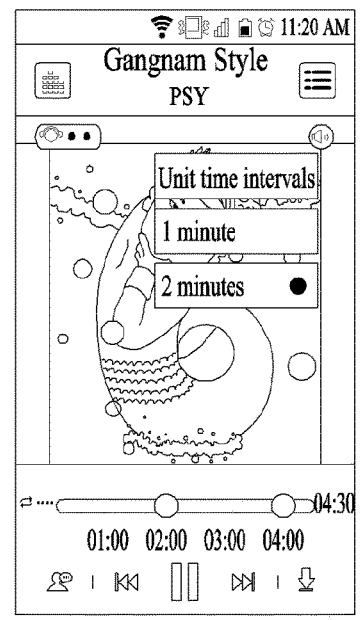
(a)  (b)
FIG. 8
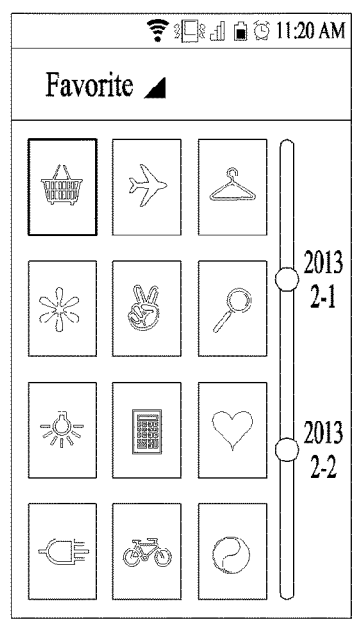

FIG. 9A
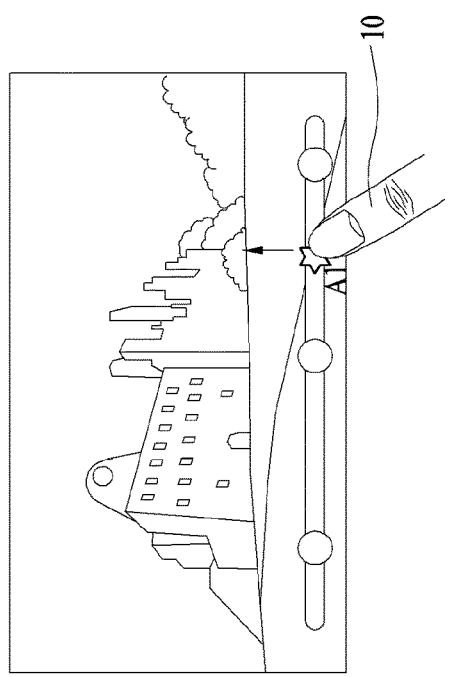
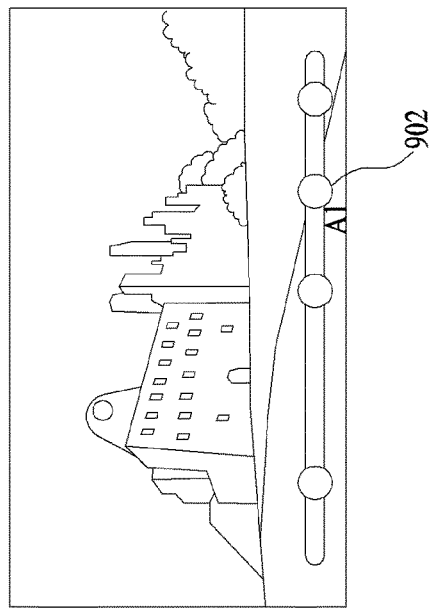

(a)  (b)

FIG. 13A
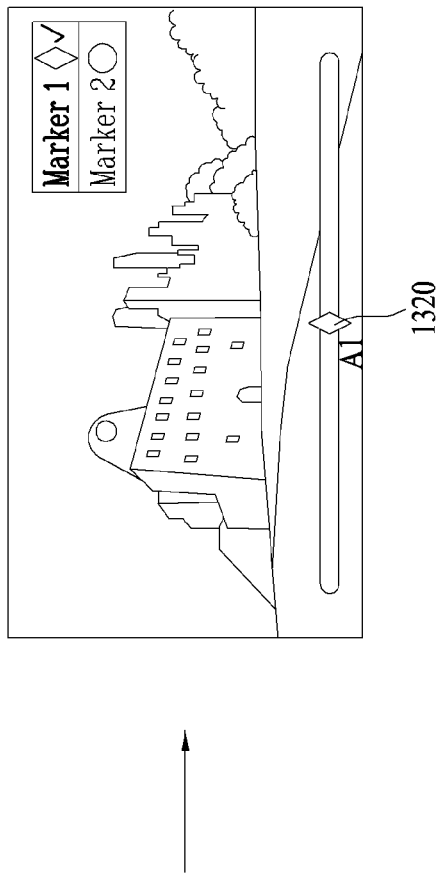
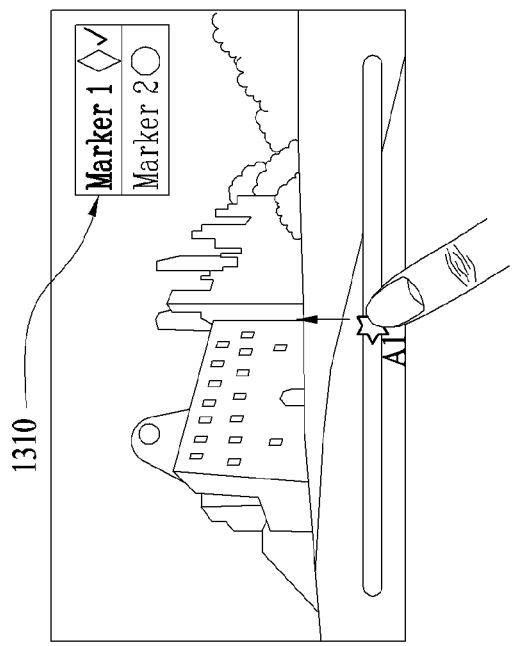

FIG. 15A
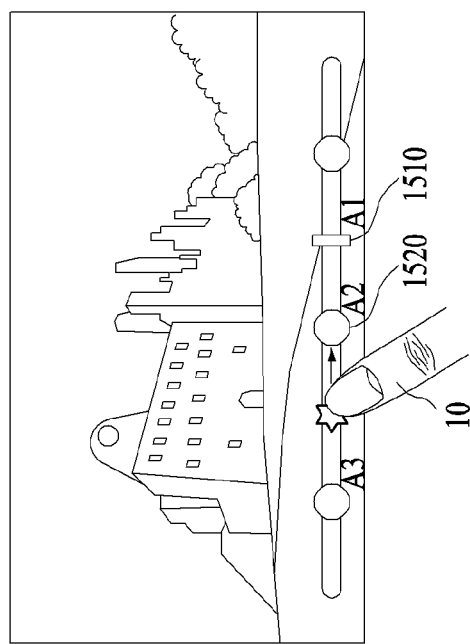
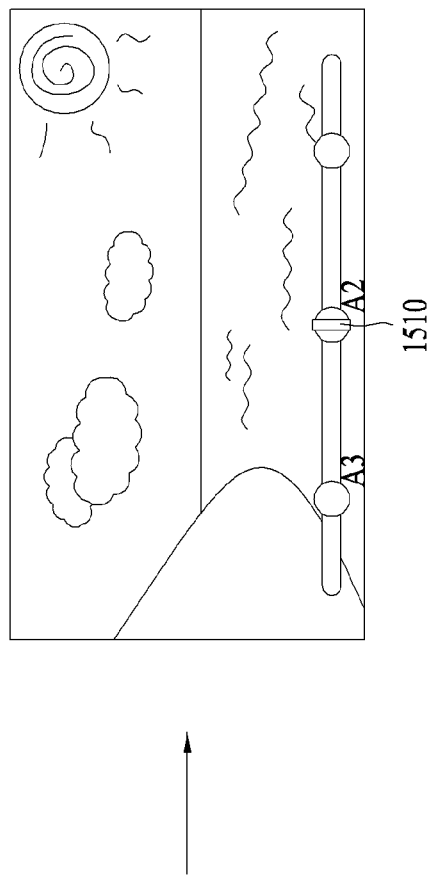

FIG. 15B
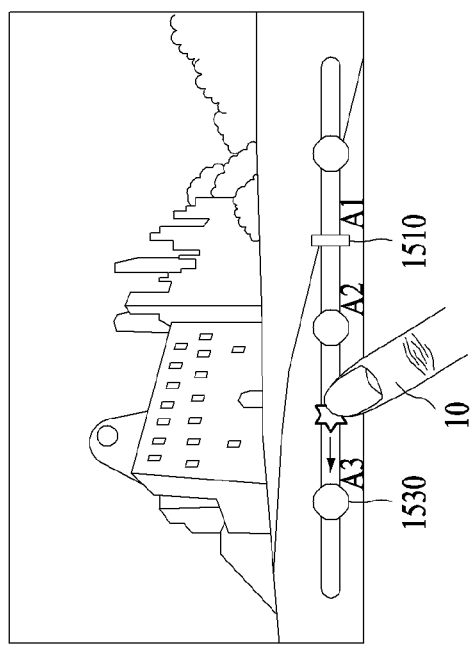
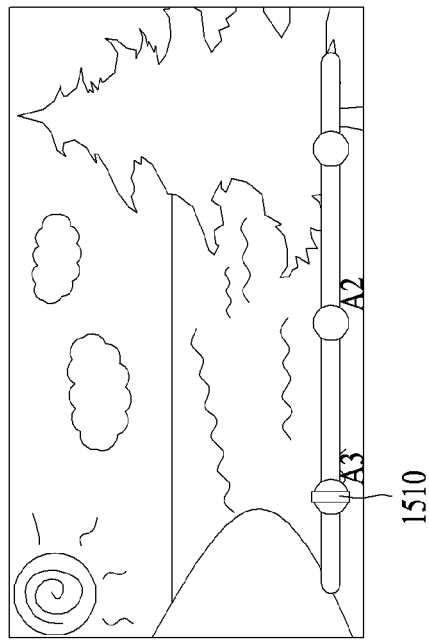

FIG. 16
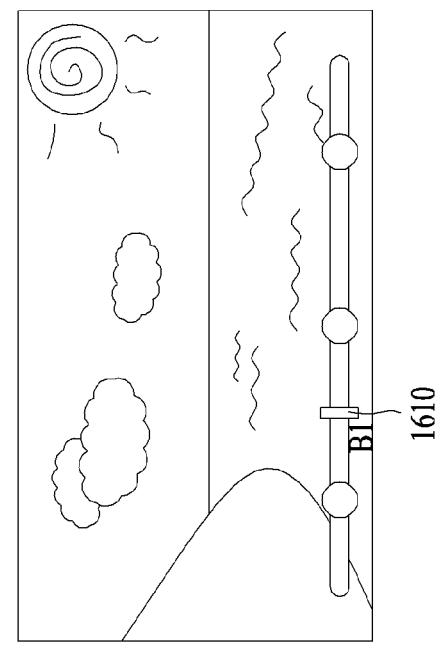
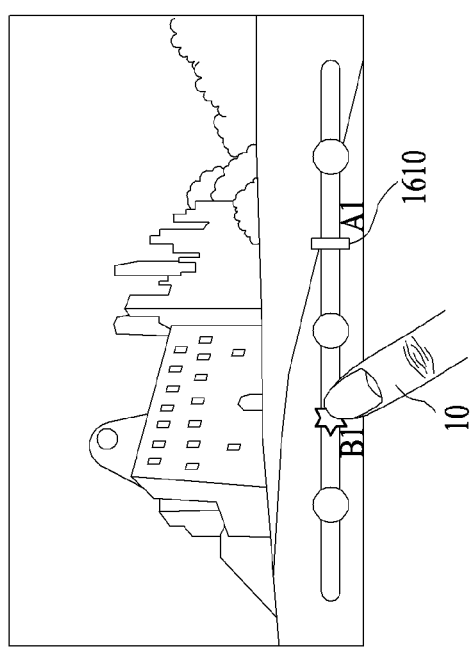

FIG. 17
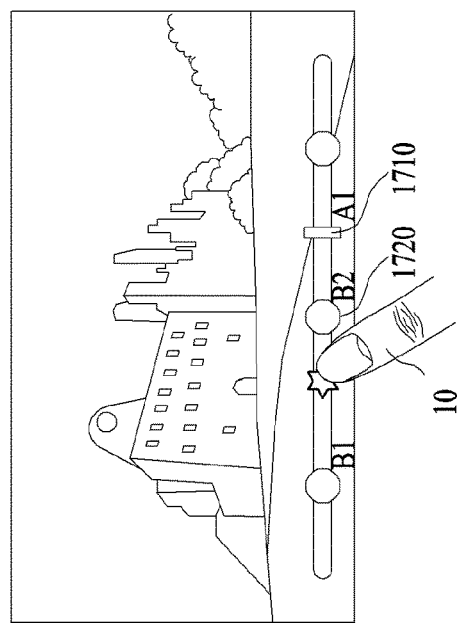
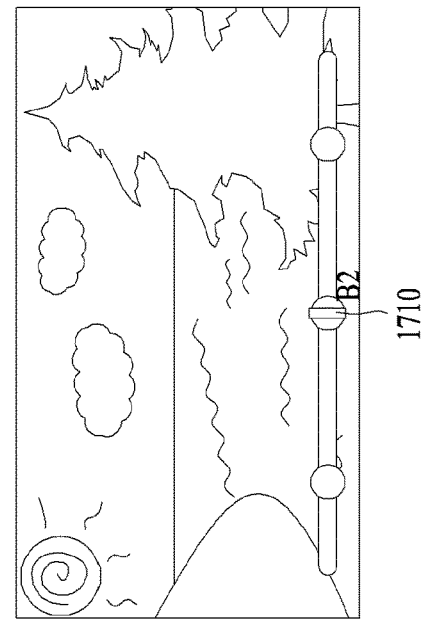

FIG. 19
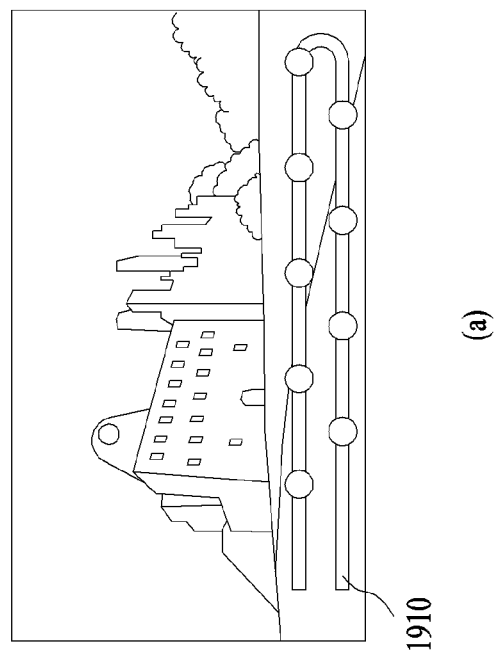
(b)
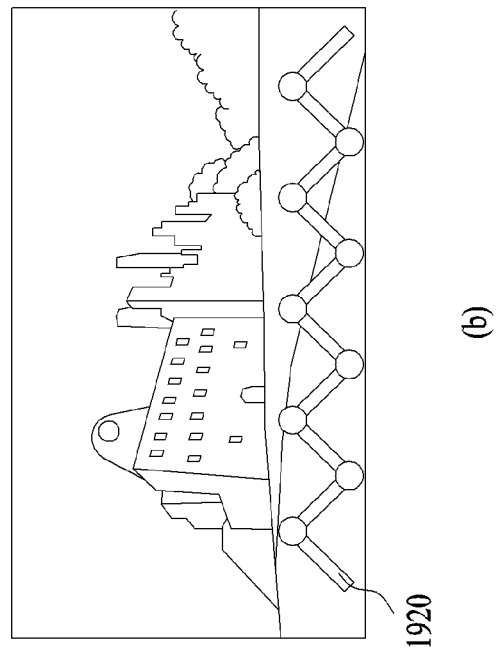
(a)

FIG. 22A
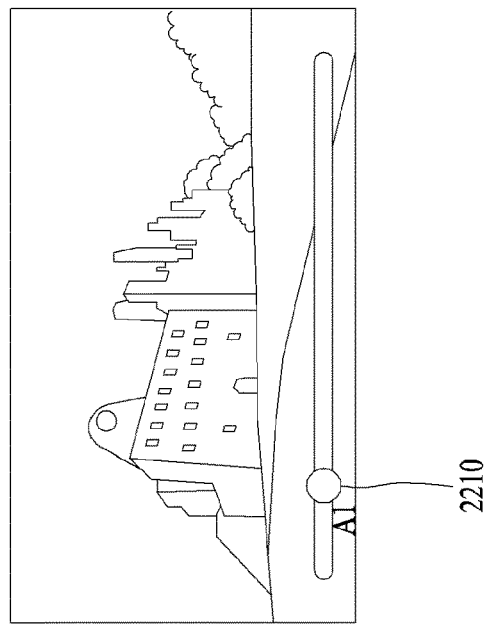
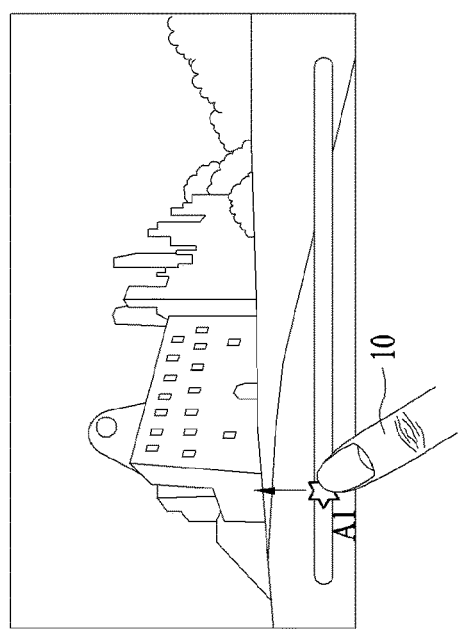

FIG. 22B
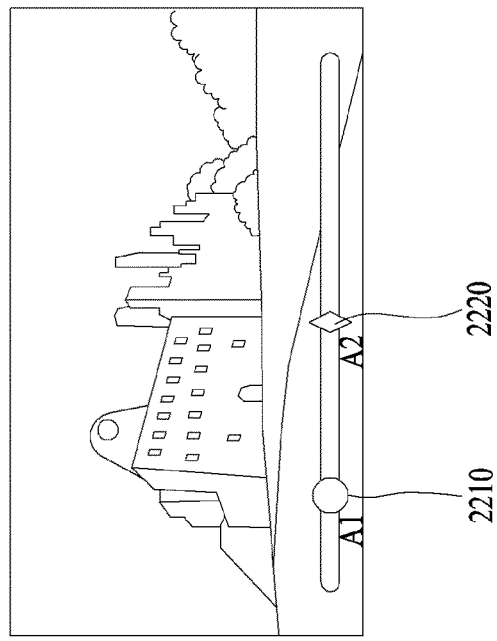
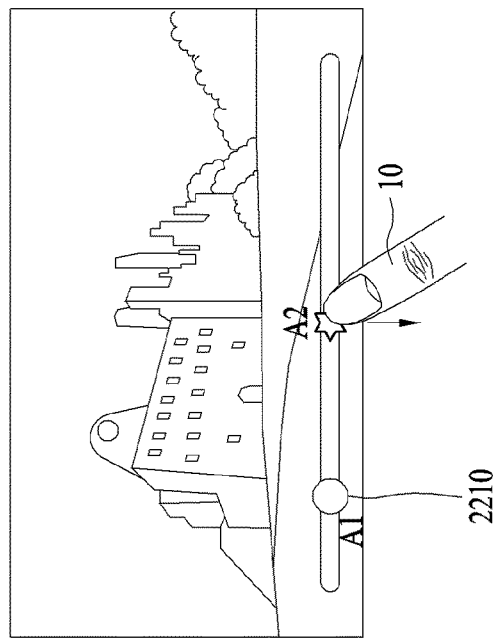

MOBILE TERMINAL HAVING INTELLIGENT SCROLL BAR

Pursuant to 35 U.S.C. § 119(a), this application claims the benefit of earlier filing date and right of priority to Korean Application No. 10-2013-0018047, filed on Feb. 20, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for reinforcing a scroll function for changing a content output.

Discussion of the Related Art

A mobile terminal can perform various functions such as data and voice communications, capturing images and video via a camera, recording audio, playing music files and outputting music via a speaker system, and displaying images and video on a display. Generally, terminals can be classified into mobile terminals and stationary terminals. The mobile terminals can be further classified into handheld terminals and vehicle mounted terminals.

There are ongoing efforts to support and increase the functionality of mobile terminals. Such efforts include software and hardware improvements, as well as changes and improvements in the structural components which form the mobile terminal. As functions of a mobile terminal are extended, the mobile functions as a multimedia device capable of playing a music file or a video file. When a user listens to a music file or views a video file through a mobile terminal, the user can adjust a play timing point of the music file or the video file through a scroll input.

However, because a display size of a mobile terminal is smaller than that of a fixed type terminal, a scroll bar length of the mobile terminal is smaller than that of the fixed type terminal as well. Thus, because it is difficult to adjust a scroll bar of the mobile terminal more accurately than to adjust a scroll bar of the fixed type terminal, a user has difficulty in changing an output point of a music or video file into a desired point.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, which enables a user to adjust an output of a content into a significant output point easily and conveniently if the significant output point is set.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a touchscreen configured to display a scroll bar for adjusting an output location of a content and at least one marker displayed on the scroll bar to indicate a specific output location of the content and a controller, if a pointer touching a first point of the scroll bar moves in a prescribed direction, controlling the output location of the content to be changed into an output location indicated by the marker located closest to the first point in the prescribed direction from the first point.

In another aspect of the present invention, a method of controlling a mobile terminal according to an embodiment of the present invention may include the steps of displaying a scroll bar for adjusting an output location of a content and at least one marker displayed on the scroll bar to indicate a specific output location of the content, receiving a touch input to a first point of the scroll bar, and if a pointer touching the first point moves in a prescribed direction, changing the output location of the content into an output location indicated by the marker located closest to the first point in the prescribed direction from the first point.

Effects obtainable from the present invention is non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 7 is a diagram illustrating one example to describe that markers are displayed on an intelligent scroll bar by unit time intervals;

FIG. 8 is a diagram illustrating one example to describe that a meta data changed point on an intelligent scroll bar is determined as a significant output point;

FIG. 9A and FIG. 9B are diagrams illustrating examples to describe that a significant output point is set manually based on a user input;

FIG. 13A and FIG. 13B are diagrams illustrating examples to describe that a color or shape of an added marker is adjusted;

FIG. 15A and FIG. 15B are diagrams illustrating examples to describe that an output of a content is changed to an output point indicated by a marker located closest to a touch point among markers put onto a moving direction of a pointer;

FIG. 16 is a diagram illustrating one example to describe an operation of a mobile terminal if a pointer touching a random point of a scroll bar is released from a corresponding contact without moving in a prescribed direction;

FIG. 17 is a diagram illustrating another example to describe an operation of a mobile terminal if a pointer touching a random point of a scroll bar is released from a corresponding contact without moving in a prescribed direction;

FIG. 19 is a diagram illustrating examples of various configurations of an intelligent scroll bar;

FIGS. 22A to 22C are diagrams illustrating one example to describe a process for setting a significant output interval;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like. However, a configuration according to an embodiment disclosed in this specification is applicable to such a fixed terminal as a digital TV, a desktop computer and the like as well as a mobile terminal.

Figure 1:
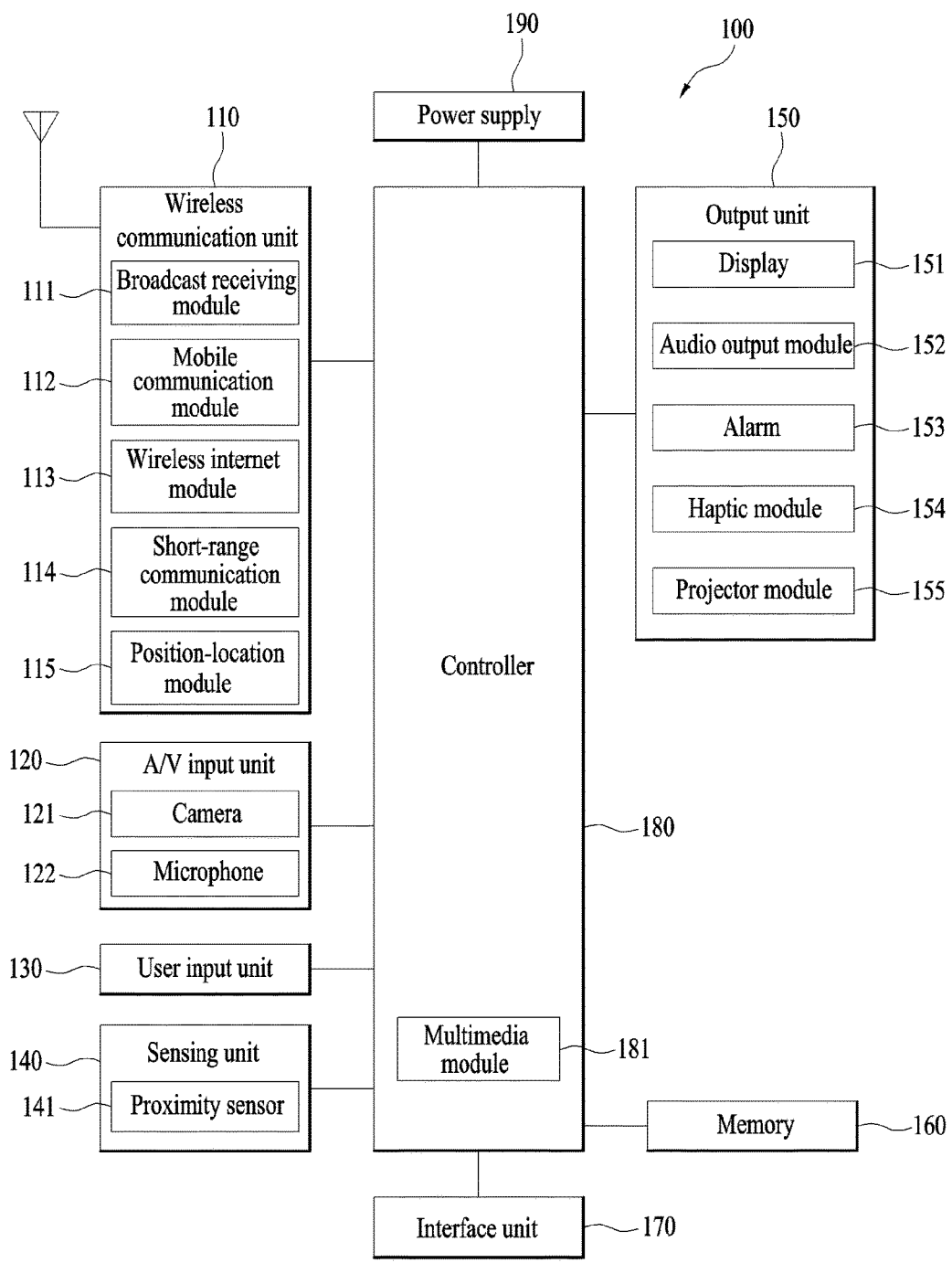
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like (not shown in the drawing).

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 3:
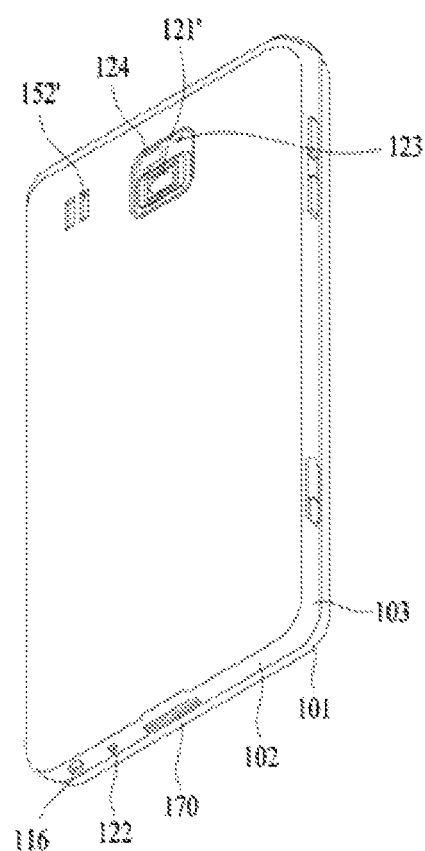
FIG. 3 is a rear perspective diagram of a mobile terminal according to one embodiment of the present invention.

Referring to FIG. 3, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
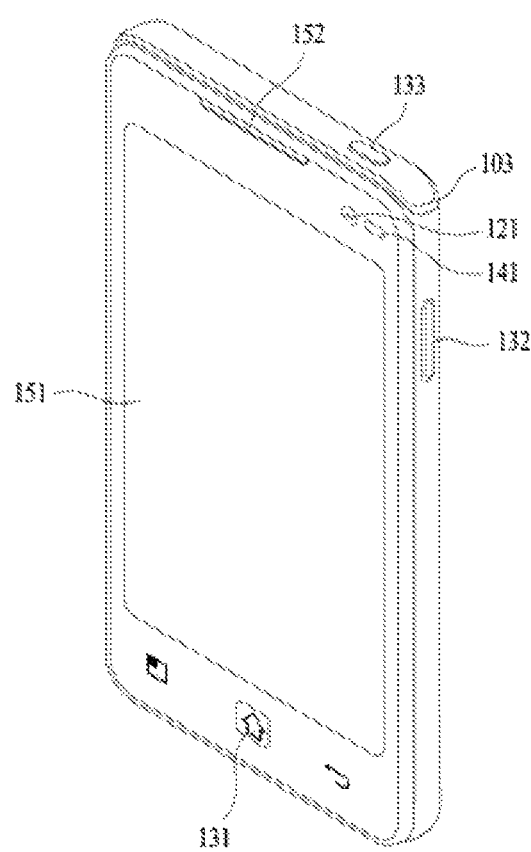
FIG. 2 is a front perspective diagram of a mobile terminal according to one embodiment of the present invention.

Next, FIGS. 2 and 3 are front and rear perspective diagrams of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIGS. 2 and 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

If the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally.

The cases 101, 102 and 103 are formed by injection molding of synthetic resin or can be formed of metal substance such as stainless steel (STS), titanium (Ti) or the like for example. A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

Referring to FIG. 3, a camera 121' can be additionally provided to a backside of the terminal body, and more particularly, to the rear case 102. The camera 121' has a photographing direction that is substantially opposite to that of the former camera 121 shown in FIG. 2 and may have pixels differing from those of the camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal according to an embodiment of the present invention may include the memory 160 configured to store a content, the touchscreen 151 configured to display a content and a scroll bar for adjusting an output position of the content, and the controller 180 controlling a current output position of the content to be adjusted into an output position indicated by a closest marker if a random point of the scroll bar is selected. The mobile terminal according to an embodiment of the present invention may further include the wireless communication unit 110 configured to receive a content externally.

Figure 4:
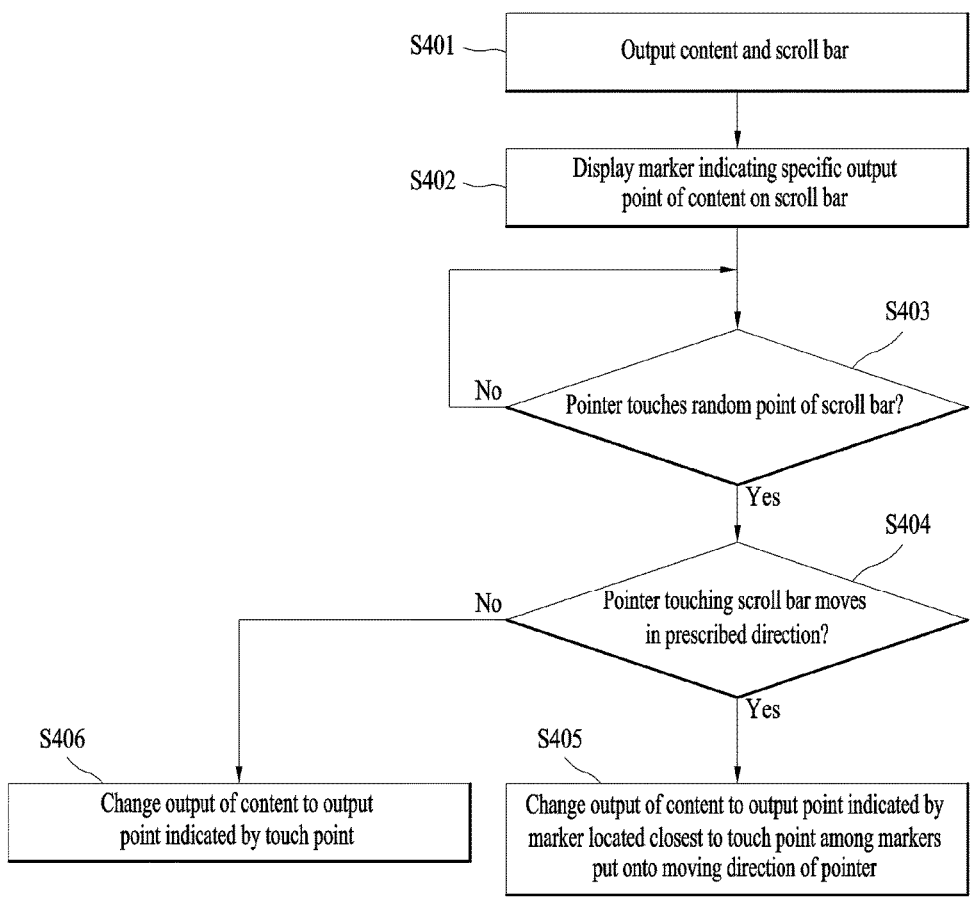
FIG. 4 is a flowchart for an operation of a mobile terminal according to an embodiment of the present invention.

FIG. 4 is a flowchart illustrating an operation of a mobile terminal according to an embodiment of the present invention. Referring to FIG. 4, the controller 180 outputs a content and a scroll bar includes (S401). The content can be saved in the memory 160 or received externally. The scroll bar is for adjusting an output point of the content to the touchscreen. In addition, the content mentioned in the present specification may include at least one of a music file, a video file, an image file, a document file and a webpage.

While the controller 180 displays a content or a list of contents, the controller 180 can display a scroll bar for adjusting an output of the content or the content list. For instance, if a content is continuously played during a prescribed time like a video file, a music file or the like or a content includes a document file scrolled by page like an e-book or the like, a user can adjust a play point of the video file, the music file or the like or a page of the e-book or the like.

For another instance, if a content has a size greater than a size outputtable through the touchscreen like a webpage, the scroll bar can be used to adjust an output position of the content. Likewise, if an output size of a content list is greater than a size outputtable through the touchscreen, the scroll bar can be used to adjust an output position of the content list.

Figure 5:
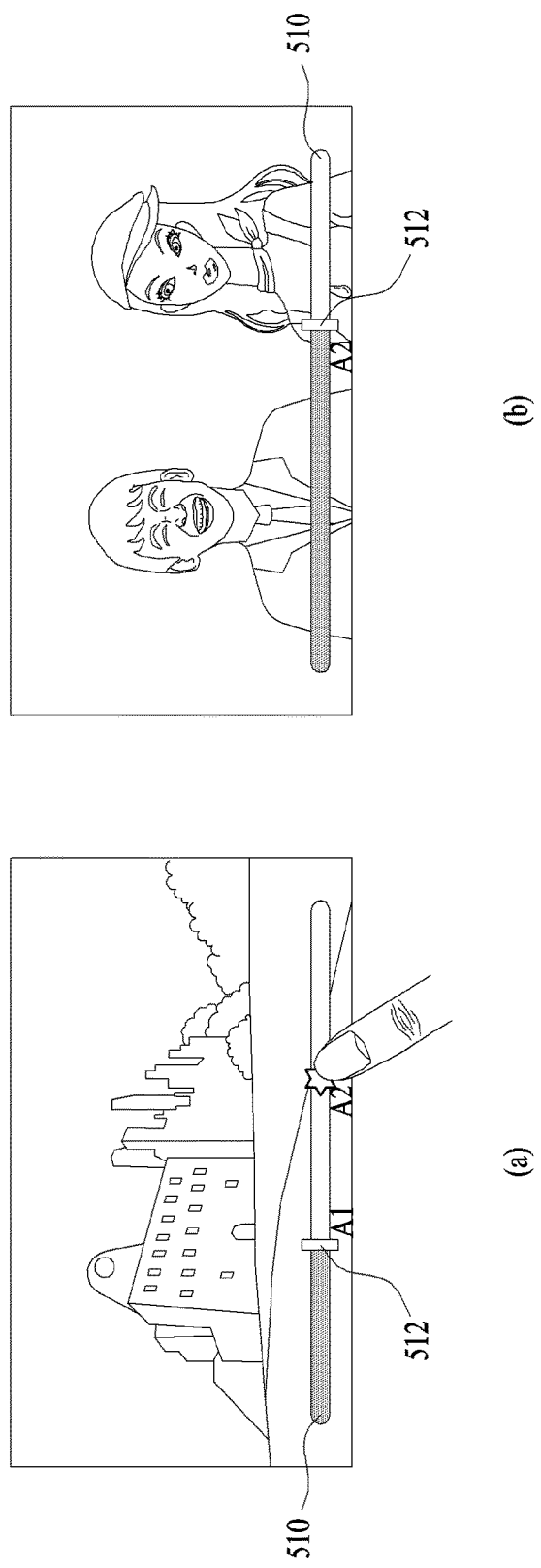
FIG. 5 is a diagram illustrating one example to describe that an output of a content is adjusted using a scroll bar.

FIG. 5 is a diagram illustrating one example to describe that an output of a content is adjusted using a scroll bar. For clarity of the following description, assume that a content mentioned in the description with reference to FIG. 5 includes a video file.

Referring to FIG. 5, while a video file is played, the controller 180 can display a scroll bar 510, which is provided to adjust a play timing point of a video. In particular, while a timing point A1 of the video file is currently played, if a point corresponding to a timing point A2 is touched (FIG. 5(a)), the controller 180 can change a play timing point of the video file into A2 (FIG. 5(b)).

In FIG. 5(a) and FIG. 5(b), an output indicator 512 displayed on the scroll bar 510 indicates a current output point of the content. A user can adjust an output of the content by adjusting a location of the output indicator 512 on the scroll bar 510.

The output indicator 512 may or may not be included with scroll bar. In the following description, the output indicator is omitted from a scroll bar, but it can be displayed on a scroll bar to indicate a current output point of a content.

Referring again to FIG. 4, while the scroll bar is displayed on the touchscreen, the controller 180 can display a marker, which indicates a specific output point of the content, on the scroll bar in response to a user input (S402). In this instance, the user input may include a touch input to the touchscreen. In particular, the user input may include at least one of a long touch of touching the scroll bar for prescribed duration, a double touch of touching the scroll bar twice quickly, and a proximity touch of placing the pointer proximate to the scroll bar by avoiding a contact between the pointer and the scroll bar, by which the present invention is non-limited. For instance, the user input can include at least one of various touch actions other than the above-enumerated touch actions. In another instance, the user input may include at least one of an action of manipulating a physical key of the mobile terminal, an action of selecting a button displayed on the touchscreen and the like as well as a touch input.

For clarity of the following description, a scroll bar displayed before displaying a marker may be named a normal marker, whereas a scroll bar after displaying a marker may be named an intelligent scroll bar. According to embodiments mentioned in the following description, if a scroll bar is mentioned without discriminating a normal scroll bar and an intelligent scroll bar from each other, it can be understood as indicating one of the normal scroll bar and the intelligent scroll bar or both of the normal scroll bar and the intelligent scroll bar, depending on a corresponding context. A process for displaying a marker on an intelligent scroll bar shall be described in detail with reference to the accompanying drawings.

Figure 6:
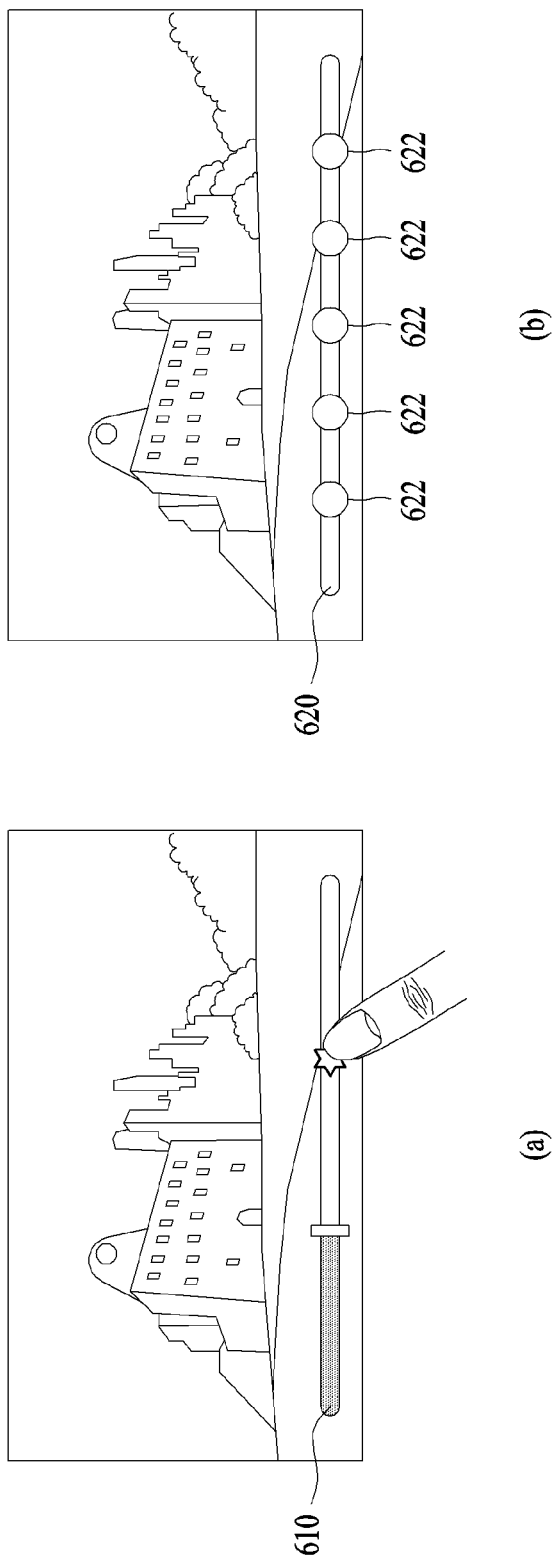
FIG. 6 is a diagram illustrating one example to describe that a normal scroll bar is changed into an intelligent scroll bar.

FIG. 6 is a diagram illustrating one example to describe that a normal scroll bar is changed into an intelligent scroll bar. For clarity of the following description, assume that a content may include a video file. Referring to FIG. 6, while a normal scroll bar is displayed, if a user input is input (FIG. 6(a)), the controller 180 can change the normal scroll bar 610 into an intelligent scroll bar 620 in response to the user input (FIG. 6(b)). When the normal scroll bar 610 is changed into the intelligent scroll bar 620, the controller 180 can display at least one marker 622 on the intelligent scroll bar 620 (FIG. 6(b)).

In addition, if a user input is applied to a point, at which the marker 622 is not displayed, on the intelligent scroll bar 620 shown in FIG. 6(b), the controller 180 can control the intelligent scroll bar 620 to be changed into the normal scroll bar 610 again. Further, a marker displayed on an intelligent scroll bar indicates a significant output point of a content. The controller 180 can determine a significant output point of a content automatically or based on a user input.

Prior to describing that a significant output point is determined manually by a user, a process for the controller 180 to automatically determine a significant output point is described in detail as follows.

<Significant Output Point of Music File>

When a content includes a music file, the controller 180 can automatically determine at least one of the following items as a significant output point.

i) Timing point at which a lyric starts after end of an interlude ii) Timing point at which a chorus of a song starts iii) Timing point at which a second paragraph of a song starts iv) Output timing point per unit time interval In the example of the item i), if a music file is music including lyrics as a song, a folk song, an opera and the like, the controller 180 can determine a timing point, at which a lyric starts after end of an interlude, as a significant output point. In the examples of the item ii) and the item iii), the controller 180 analyzes a music file and can then determine a timing point, at which a chorus of a song starts or a second paragraph of a song starts after end of a first paragraph of the song, as a significant point.

In the example of the item iv), the controller 180 can determine an output timing point per unit time interval as a significant output point. For instance, if a unit time interval is 1 minute, the controller 180 can display markers on the intelligent scroll bar by 1-minute intervals. In this instance, the unit time interval can be automatically set by the controller 180. Alternatively, the unit time interval can be manually adjusted by a user.

For example, FIG. 7 is a diagram illustrating one example to describe that markers are displayed on an intelligent scroll bar by unit time intervals. Referring to FIG. 7 (a), if a unit time interval is 1 minute, the controller 180 can display markers on the intelligent scroll bar by 1-minute intervals. Assuming that a running time of a music file is 4 minutes and 30 seconds, like the example shown in FIG. 7(a), a total of 4 markers can be displayed on the intelligent scroll bar to correspond to timing points of 1 minute, 2 minutes, 3 minutes and 4 minutes, respectively.

In this instance, the unit time interval can be automatically set by the controller 180. Alternatively, the unit time interval can be manually adjusted by a user. For instance, referring to FIG. 7(b), When a unit time interval is adjusted into 2 minutes by user settings, the controller 180 can display markers by 2-minute intervals. In FIG. 7(b), a total of 2 markers can be displayed on the intelligent scroll bar to correspond to timing points of 2 minutes and 4 minutes, respectively.

<Output Point of Video File>

When a content includes a video file, the controller 180 can automatically determine at least one of the following items as a significant output point.

i) Timing point at which an advertisement ends or starts ii) Timing point at which a movie intro ends iii) Timing point at which a movie outro starts iv) Timing point at which a speech scene starts or a caption is initially displayed v) Timing point at which a short story ends or starts in case of a video including an omnibus or a plurality of chapters vi) Timing point at which a user adds a memo or bookmark vii) Output timing point per unit time interval In the example of the item i), if an advertisement is included in a video file, the controller 180 can determine a timing point, at which an advertisement ends and a play of a main program starts, as a significant output point. In the examples of the item ii) and the item iii), the controller 180 can determine a timing point, at which a movie intro ends or a movie outro starts, as a significant point. In this instance, the intro of the movie can include a logo play interval of a producer or distributor and the outro of the movie can include a play interval of an ending credit.

In the example of the item iv), the controller 180 can determine a timing point, at which a speech scene having a voice of an initially appearing character detected starts or a caption is initially displayed, as a significant output point. In the example of the item v), if a video has an omnibus configuration including a plurality of pieces aggregated therein, the controller 180 can determine a timing point, at which a prescribed piece ends and a next piece starts, as a significant output point.

While a user is watching a video, if the user adds a memo or a bookmark in a specific scene, like the example of the item vi), the controller 180 can determine a timing point, at which the user adds the memo, as a significant output point.

In the example of the item vi), the controller 180 can determine an output timing point per unit time interval as a significant output point. For instance, if the unit time interval is 10 minutes, the controller 180 can determine timing points corresponding to play timing points of 10 minutes, 20 minutes and 30 minutes as significant output points, respectively. In doing so, as mentioned in the foregoing description with reference to FIG. 7, the unit time interval can be manually adjusted by a user.

<Significant Output Point of Document File>

When a content includes a document file, the controller 180 can automatically determine at least one of the following items as a significant output point.

i) Page at which a new chapter starts ii) Page in which a user's memo is inserted iii) Page on which a bookmark is set iv) Output page per unit page interval In the example of the item i), if a document file includes a plurality of chapters, the controller 180 can determine a start page of each of the chapters as a significant output point. For instance, if a document file includes 3 chapters, the controller 180 can determine a start page of Chapter 1, a start page of Chapter 2 and a start page of Chapter 3 as significant output points, respectively.

In the example of the item ii), the controller 180 can determine a user's memo inserted page as a significant output point. While a user is reading a document file, the user underlines prescribed words or inputs a handwriting, a memo can be inserted in a specific page. If the user determines a memo inserted page as a significant output point, the user can search for a content of his own memo easily.

In the example of the item iii), the controller 180 can determine a bookmarked page as a significant output point. In the example of the item iv), the controller 180 can control a marker to be automatically displayed on an output page per unit page interval. For instance, When a unit page interval is 10 pages, the controller 180 can control markers to be set by 10-page intervals like 11 pages, 21 pages, 31 pages and the like. In doing so, the unit page interval may be automatically determined by the controller 180. Moreover, as mentioned in the foregoing description with reference to FIG. 7, the unit page interval can be adjusted manually by a user.

<Significant Output Point of Content List>

When a content list is displayed, the controller 180 can automatically determine at least one of the following items as a significant output point.

i) Point at which meta data is changed if contents are sorted by prescribed meta data ii) Point at which a content bookmarked by a user is set In the example of the item i), when contents are sorted by prescribed metadata of the contents, the controller 180 can determine a metadata changed point as a significant output point.

For instance, FIG. 8 is a diagram illustrating one example to describe that a metadata changed point on an intelligent scroll bar is determined as a significant output point. For clarity of the following description, assume that image files photographed on 2013-1-1, image files photographed on 2013-2-1 and image files photographed on 2013-2-2 are sorted on a content list by photographed dates in ascending order.

Referring to FIG. 8, the controller 180 determines a boundary between the image file photographed on 2013-1-1 and the image file photographed on 2013-2-1, i.e., a point, at which the image file photographed on 2013-2-1 is initially exposed, as a significant output point and can then display a marker thereon. Moreover, referring to FIG. 8, the controller 180 determines a boundary between the image file photographed on 2013-2-1 and the image file photographed on 2013-2-2, i.e., a point, at which the image file photographed on 2013-2-2 is initially exposed, as a significant output point and can then display a marker thereon.

Thus, if a marker is displayed on each metadata changed point, as shown in FIG. 8, a user can find a desired content easily. When a content bookmarked by a user exists among contents, like the example of the item ii), the controller 180 determines a bookmarked content exposed point as a significant output point and can then control a marker to be output to the determined significant output point.

When a normal scroll bar is changed into an intelligent scroll bar, the controller 180 can determine a significant output point automatically in accordance with a type of a content. Furthermore, the controller 180 can manually add or delete a significant output point based on a user input. This is described in detail with reference to the accompanying drawings as follows.

Figure 9B:
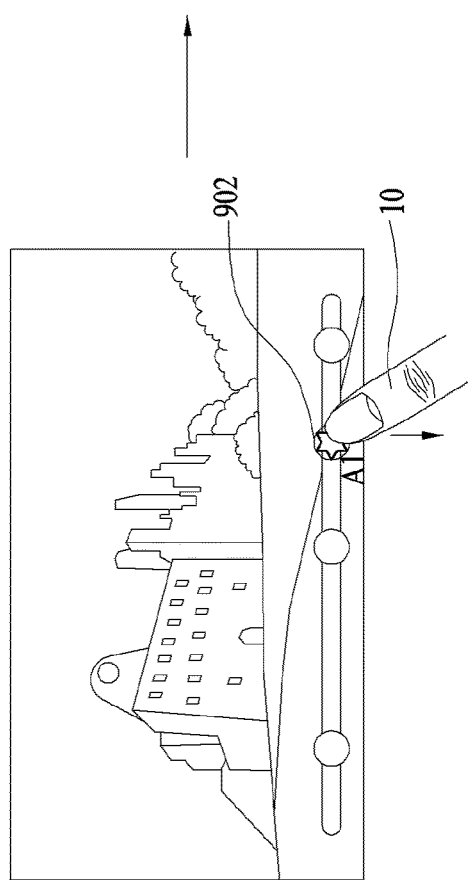

FIG. 9A and FIG. 9B are diagrams illustrating examples to describe that a significant output point is set manually based on a user input. In particular, while a scroll bar is displayed, the controller 180 can add a user-selected point as a significant output point or delete a preset significant output point, based on a user input applied to the scroll bar.

Referring to FIG. 9A, when a pointer 10 touching a timing point A1 of a scroll bar moves in a first direction vertical to the scroll bar, the controller 180 sets the timing point A1 selected by a user's touch as a significant output point and can then display a marker 902 on the timing point A1.

On the contrary, referring to FIG. 9B, if a pointer 902 corresponding to a timing point A1 on a scroll bar moves in a second direction vertical to the scroll bar, the controller 180 releases the timing point A1 selected by a touch input from a significant output point and can then delete a marker 920 displayed on the timing point A1.

Like the examples shown in FIG. 9A and FIG. 9B, a user touches a scroll bar to set a desired output point as a significant output point or delete the desired output point from the significant output point. In FIG. 9A and FIG. 9B, the first direction includes a top direction and the second direction includes a bottom direction opposite to the first direction, by which the present invention is non-limited. For instance, a significant output point can be set or cancelled by a touch input different from that in the example shown in FIG. 9A or FIG. 9B.

Figure 10:
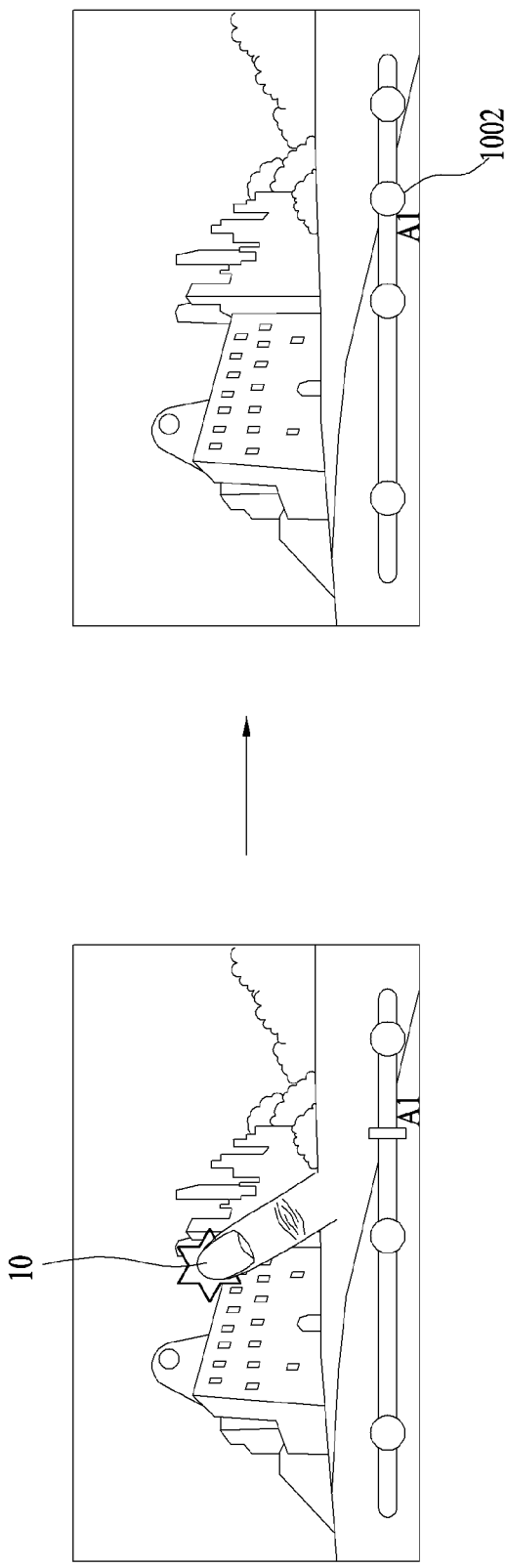
FIG. 10 is a diagram illustrating another example to describe that a significant output point is set manually based on a user input.

Next, FIG. 10 is a diagram illustrating another example to describe that a significant output point is set manually based on a user input. Referring to FIG. 10, while a content is displayed, if a user input is applied to the displayed content, the controller 180 can add a current play timing point or a current output position as a significant output point. In particular, while a timing point A1 of a video file is played, if a user double touches a play image with a pointer 10, the controller 180 adds the timing point A1 as a significant output point and can then display a marker 1002 at the timing point A1.

Like the examples shown in FIG. 9A, FIG. 9B and FIG. 10, the controller adds a user-selected specific point or a current output point of a content as a significant output point and can then display a marker at the added significant output point. When a played content is a music file, the controller 180 can add an output point of a lyric, which is selected by a user while a song is output, as a significant output point. This is described in detail with reference to FIG. 11 as follows.

Figure 11:
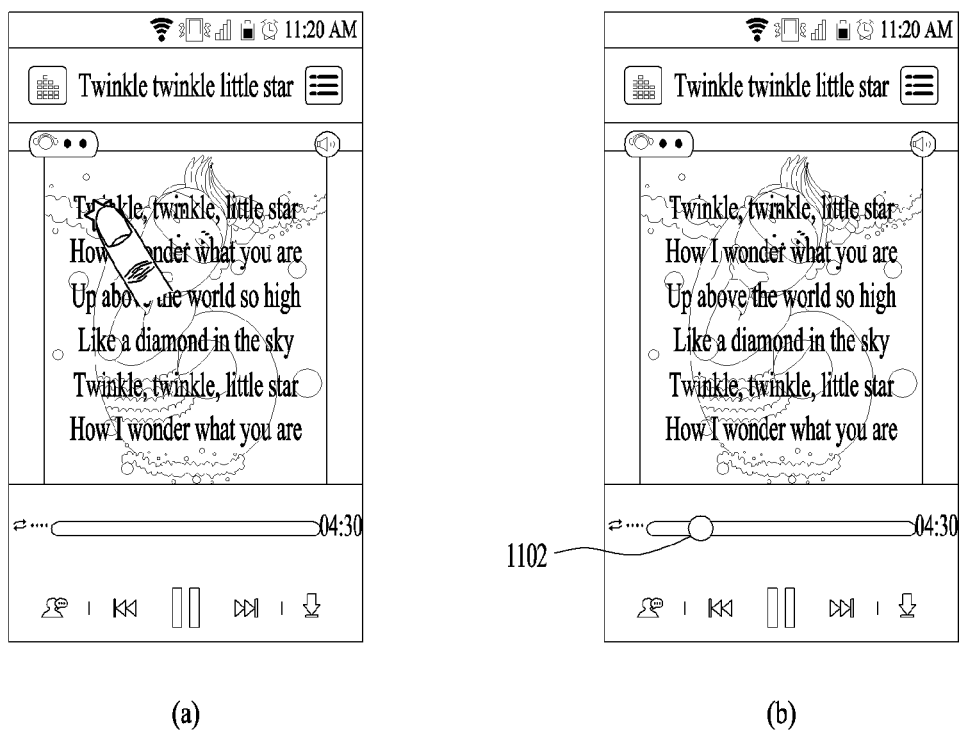
FIG. 11 is a diagram illustrating one example to describe that an output point of a word selected by a user is set as a significant output point.

FIG. 11 is a diagram illustrating one example to describe that an output point of a word selected by a user is set as a significant output point. Referring to FIG. 11, while a music file is played, the controller 180 can display lyrics of a song in response to a user input (FIG. 11(*a*)). Subsequently, if a specific word is selected from the song lyrics (e.g., a word 'Twinkle' is selected in FIG. 11(*a*)), the controller 180 adds a timing point of outputting the selected word of lyric as a significant output point and can then display a marker 1102 on an intelligent scroll bar (FIG. 11(*b*)).

As mentioned in the foregoing description, a significant output point can be determined automatically by the controller or can be determined manually by a user. The controller 180 of the present invention can control a significant output point to be determined automatically or manually based on a user's input. This is described in detail with reference to FIG. 12 as follows.

Figure 12:
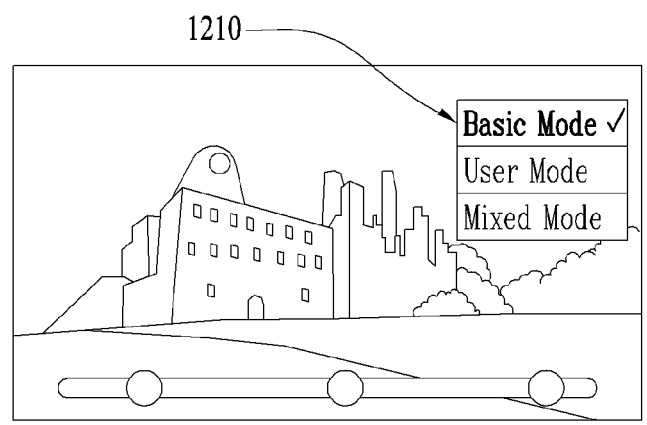
FIG. 12 is a diagram illustrating one example of a screen provided to a user to set a significant output point determining method.

FIG. 12 is a diagram illustrating one example of a screen provided to a user to set a significant output point determining method. Referring to FIG. 12, the controller 180 can display a popup window 1210, which is provided to set up a method of determining a significant output point, in response to a user input. In the popup window 1210 shown in FIG. 12, a basic mode may be provided to set the controller 180 to automatically determine a significant output point and a user mode may be provided to set a significant output point to be manually determined. Moreover, a mixed mode may be provided to set the controller 180 to automatically determine a significant output point and to further set a user to determine a significant output point manually.

In the example shown in FIG. 12, the controller 180 can determine whether to determine a significant output point automatically or manually depending on a user's setting. In adding a significant output point, the controller 180 can adjust a color and/or shape of a marker displayed on the significant output point. In particular, the controller 180 sorts a plurality of markers into groups by types and can then apply a different color and/shape to a marker belong to a different group. This is described in detail with reference to FIG. 13A and FIG. 13B as follows.

Figure 13B:
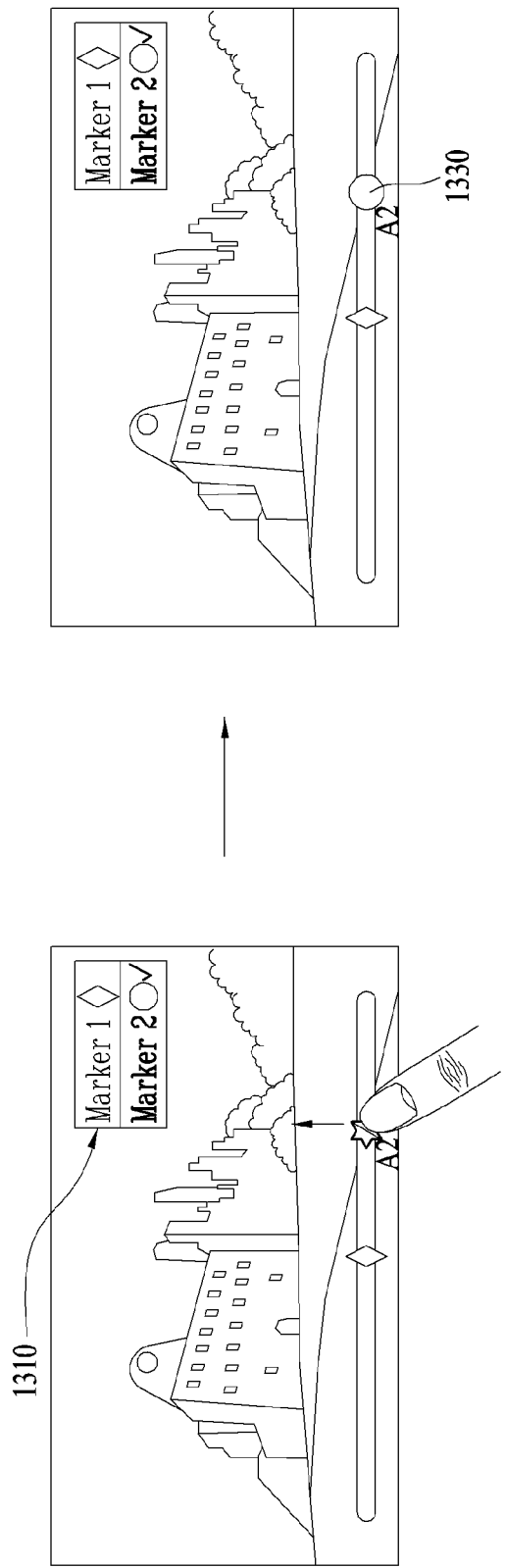

FIG. 13A and FIG. 13B are diagrams illustrating examples to describe that a color or shape of an added marker is adjusted. For clarity and convenience, assume that a shape of an added marker can be adjusted in FIG. 13. Referring to FIG. 13A, the controller 180 can display a popup window 1310 for changing a shape of a marker. While a marker in a first shape is selected in the popup window 1310 shown in FIG. 13A, if a timing point A1 is added as a significant output point, the controller 180 can display a marker 1320 in the first shape at the timing point A1.

On the other hand, referring to FIG. 13B, while a marker in a second shape is selected in the popup window 1310, if a timing point A2 is added as a significant output point, the controller 180 can display a marker 1330 in the second shape at the timing point A2.

In the examples shown in FIG. 13A and FIG. 13B, a color or shape of a marker displayed at a significant output point can be manually adjusted instead of being fixed. Although FIG. 13A or FIG. 13B shows that a shape of a marker can be adjusted if a marker is newly added to an intelligent scroll bar, the shape of the marker can be changed after adding the marker to the intelligent scroll bar. Moreover, as mentioned in the foregoing description, a color of a marker can be adjusted as well as a shape of the marker.

When markers in the various shapes or colors are displayed on an intelligent scroll bar, a user can control a desired marker to be displayed only using a marker's shape or color. This is described in detail with reference to FIG. 14 as follows.

Figure 14:
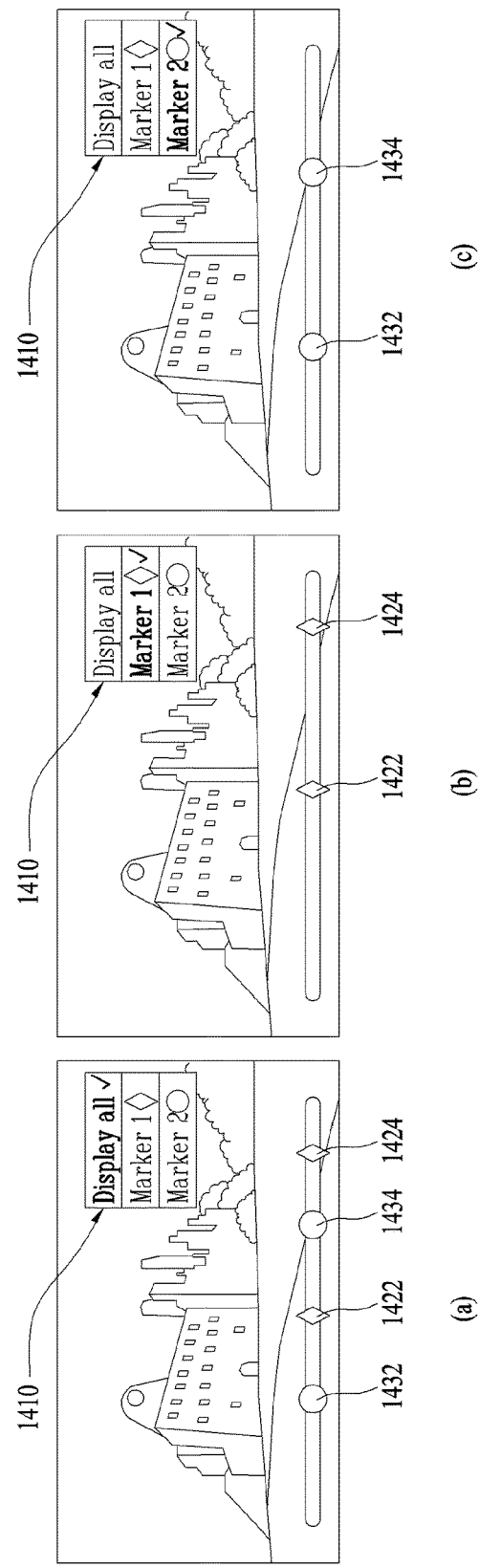
FIG. 14 is a diagram illustrating one example to describe that an indexing is performed using a shape or color of a marker.

FIG. 14 is a diagram illustrating one example to describe that an indexing is performed using a shape or color of a marker. For clarity of the following description, assume that markers 1422 and 1424 of first shape (e.g., diamond shape) and markers 1432 and 1434 of second shape (e.g., oval shape) are currently displayed on an intelligent scroll bar.

Referring to FIG. 14, the controller 180 can display a popup window 1410, which is provided for an indexing, to be output to the touchscreen (FIG. 14(a)). In the popup window 1410 shown in FIG. 14(a), all display items may be provided to enable the markers 1422 and 1424 in the first shape and the markers 1432 and 1434 in the second shape to be displayed on an intelligent scroll bar.

If the marker of the first shape is selected from the popup window 1410, the controller 180 can display the markers 1422 and 1424 in the first shape to be displayed on the intelligent scroll bar only among the markers 1422 and 1424 in the first shape and the markers 1432 and 1434 in the second shape (FIG. 14(b)). If the marker of the second shape is selected from the popup window 1410, the controller 180 can display the markers 1432 and 1434 in the second shape to be displayed on the intelligent scroll bar only among the markers 1422 and 1424 in the first shape and the markers 1432 and 1434 in the second shape (FIG. 14(c)).

Referring again to FIG. 4, while the marker is displayed on the scroll bar, and after a random point of the scroll bar has been touched (Yes in S403), if the pointer 10 moves in a prescribed direction (Yes in S404), the controller 180 can change an output point of the content into an output point indicated by the marker located closest to the touch point among the markers placed onto the moving direction of the pointer 10 (S405).

In particular, when the pointer 10 currently touching the scroll bar moves in the first direction in parallel with the scroll bar, the controller 180 can change the output of the content to the output point indicated by the marker located closest to the touch point among the markers located in the first direction from the touch point. On the other hand, when the pointer 10 currently touching the scroll bar moves in the second direction in parallel with the scroll bar, the controller 180 can change the output of the content to the output point indicated by the marker located closest to the touch point among the markers located in the second direction from the touch point.

In addition, if the pointer 10 currently touching the random point of the scroll bar is flicked or dragged in a prescribed direction, the controller 180 can determine that the pointer 10 has moved in the prescribed direction. A process for changing an output of a content is described in detail with reference to FIG. 15A and FIG. 15B as follows.

FIG. 15A and FIG. 15B are diagrams illustrating examples to describe that an output of a content is changed to an output point indicated by a marker located closest to a touch point among markers put onto a moving direction of a pointer. For clarity of the following description, assume that a content includes a video file, of which timing point A1 is played. In addition, assume that an intelligent scroll bar is placed lengthwise on the touchscreen in a horizontal direction.

Referring to FIG. 15A, after a random point of a scroll bar has been touched, if a pointer 10 moves in a right direction, the controller 180 can change an output of a content to an output point indicated by a marker located closest to the touch point among markers placed in the right direction of the touch point.

In the example shown in FIG. 15A, since the output point indicated by the marker 1520 located closest to the touch point among the markers placed in the right direction of the touch point is A2, an output of a video file may be changed to A2 from A1 (i.e., an output indicator 1510 has moved to A2 from A1 in FIG. 15A).

On the other hand, referring to FIG. 15B, after a random point of a scroll bar has been touched, if a pointer 10 moves in a left direction, the controller 180 can change an output of a content to an output point indicated by a marker located closest to the touch point among markers placed in the left direction of the touch point.

In the example shown in FIG. 15B, since the output point indicated by the marker 1530 located closest to the touch point among the markers placed in the left direction of the touch point is A3, an output of a video file may be changed to A3 from A1 (i.e., an output indicator 1510 has moved to A3 from A1 in FIG. 15B).

In FIG. 15A or FIG. 15B, because the scroll bar is placed lengthwise in the horizontal direction, a user can adjust an output of the content by touching the scroll bar and then moving the pointer 10 in the right/left direction. However, unlike the examples shown in FIG. 15A and FIG. 15B, when a scroll bar is placed lengthwise in a vertical direction, a user can adjust an output of the content by touching the scroll bar and then moving the pointer 10 in a top/bottom direction.

When the output of the content is changed to the output point indicated by the marker located closest to the touch point among the markers placed onto the moving direction of the pointer 10, the controller 180 can output a feedback in order to indicate that the output of the content has been changed to the output point indicated by the corresponding marker. In doing so, the feedback can be output as at least one of vibration, sound and LED lighting.

After the random point of the scroll bar has been touched (Yes in S403), if the pointer 10 is released from the corresponding contact instead of moving in a prescribed direction (No in S404), the controller 180 can adjust an output of the content to an output point indicated by the touch point like the normal scroll bar (S406). This is described in detail with reference to FIG. 16 as follows.

FIG. 16 is a diagram illustrating one example to describe an operation of a mobile terminal if a pointer touching a random point of a scroll bar is released from a corresponding contact without moving in a prescribed direction. For clarity of the following description, assume that a content includes a video file, of which timing point A1 is played. In addition, assume that an intelligent scroll bar is placed lengthwise on the touchscreen in a horizontal direction.

Referring to FIG. 16, after a random point of a scroll bar has been touched, if a pointer 10 is released from the corresponding contact instead of moving in a right or left direction, the controller 180 can change an output of the content to an output point indicated by the touch point. For instance, if the touch point indicates a timing point B1, the controller 180 can change an output of a video file to B1 from A1 (e.g., an output indicator 1610 has moved to B1 from A1 in FIG. 16).

According to another embodiment of the present invention, if the pointer is released from a corresponding contact instead of moving in a prescribed direction (No in S404), the mobile terminal can control an output of the content to be adjusted to an output point indicated by a marker located closest to the touch point in order to replace the step S405. This is described in detail with reference to FIG. 17 as follows.

FIG. 17 is a diagram illustrating another example to describe an operation of a mobile terminal if a pointer touching a random point of a scroll bar is released from a corresponding contact without moving in a prescribed direction. Like the example shown in FIG. 16, for clarity of the following description, assume that a content includes a video file, of which timing point A1 is played. In addition, assume that an intelligent scroll bar is placed lengthwise on the touchscreen in a horizontal direction.

Referring to FIG. 17, if a random point of a scroll bar is touched, the controller 180 can control an output of a content to be adjusted to an output point indicated by a marker located closest to the touch point. In FIG. 17, because the output point indicated by the marker 1720 located closest to the touch point B1 is B2, the controller 180 can change an output of a video file to B2 from A1 (e.g., an output indicator 1710 has moved to B2 from A1 in the example shown in FIG. 17).

When the output of the content is changed to the output point indicated by the marker located closest to the touch point, the controller 180 can output a feedback in order to indicate that the output of the content has been changed to the output point indicated by the corresponding marker. In doing so, the feedback can be output as at least one of vibration, sound and LED lighting.

According to another embodiment of the present invention, if the pointer is released from a corresponding contact (No in S404), the mobile terminal can control an interval, which is set up by markers provided to both sides of the touch point, to be repeatedly played in order to replace the step S405. This is described in detail with reference to FIG. 18 as follows.

Figure 18:
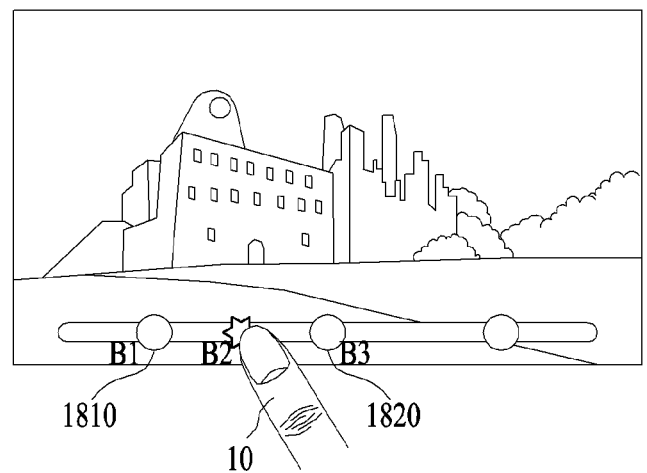
FIG. 18 is a diagram illustrating further example to describe an operation of a mobile terminal if a pointer touching a random point of a scroll bar is released from a corresponding contact without moving in a prescribed direction.

FIG. 18 is a diagram illustrating a further example to describe an operation of a mobile terminal if a pointer touching a random point of a scroll bar is released from a corresponding contact without moving in a prescribed direction.

Referring to FIG. 18, if a pointer 10 touches a timing point B2 between a marker 1810 indicating a timing point B1 and a marker 1820 indicating a timing point B3 and is then released from the corresponding contact, the controller 180 can control an interval between B1 and B3, which is defined by the markers 1810 and 1820 provided next to both sides of the touch point, to be repeatedly played. In this instance, the interval between B1 and B3 may be repeatedly played until a user's end input is applied.

Alternatively, the interval between B1 and B3 may be repeatedly played depending on a count of touches applied to the corresponding interval. For instance, if a user touches the timing point B2 between B1 and B3 n times, the controller 180 can control the interval between B1 and B3 to be played repeatedly n times.

In the above-mentioned drawings, the intelligent scroll bar is configured by extending in a horizontal direction. When a normal scroll bar is changed into an intelligent scroll bar, a mobile terminal according to one embodiment of the present invention can control a configuration of a scroll bar to be changed. This is described in detail with reference to FIG. 19 as follows.

FIG. 19 is a diagram illustrating examples of various configurations of an intelligent scroll bar. Referring to FIG. 19, the controller 180 can display an intelligent scroll bar 910 with a U-shape rotated counterclockwise at 90 degrees (FIG. 19(a)). Alternatively, the controller 180 can display an intelligent scroll bar 1920 in a shape of a zigzagged line (FIG. 19(b)). When the intelligent bar is displayed in a zigzagged line shape, a marker can be displayed at a bent point of the zigzagged line (FIG. 19(b)). In particular, the controller 180 can display the intelligent scroll bar 1920 by being bent multiple times as many as the number of markers.

In the example shown in FIG. 19, if a configuration or shape of an intelligent scroll bar is changed, the intelligent scroll bar can have a length greater than that of a normal scroll bar. Therefore, a user can perform a sophisticated adjustment using the intelligent scroll bar.

A mobile terminal according to one embodiment of the present invention can display an intelligent scroll bar by extending a partial interval of a normal scroll bar. This is described in detail with reference to FIG. 20 as follows.

Figure 20:
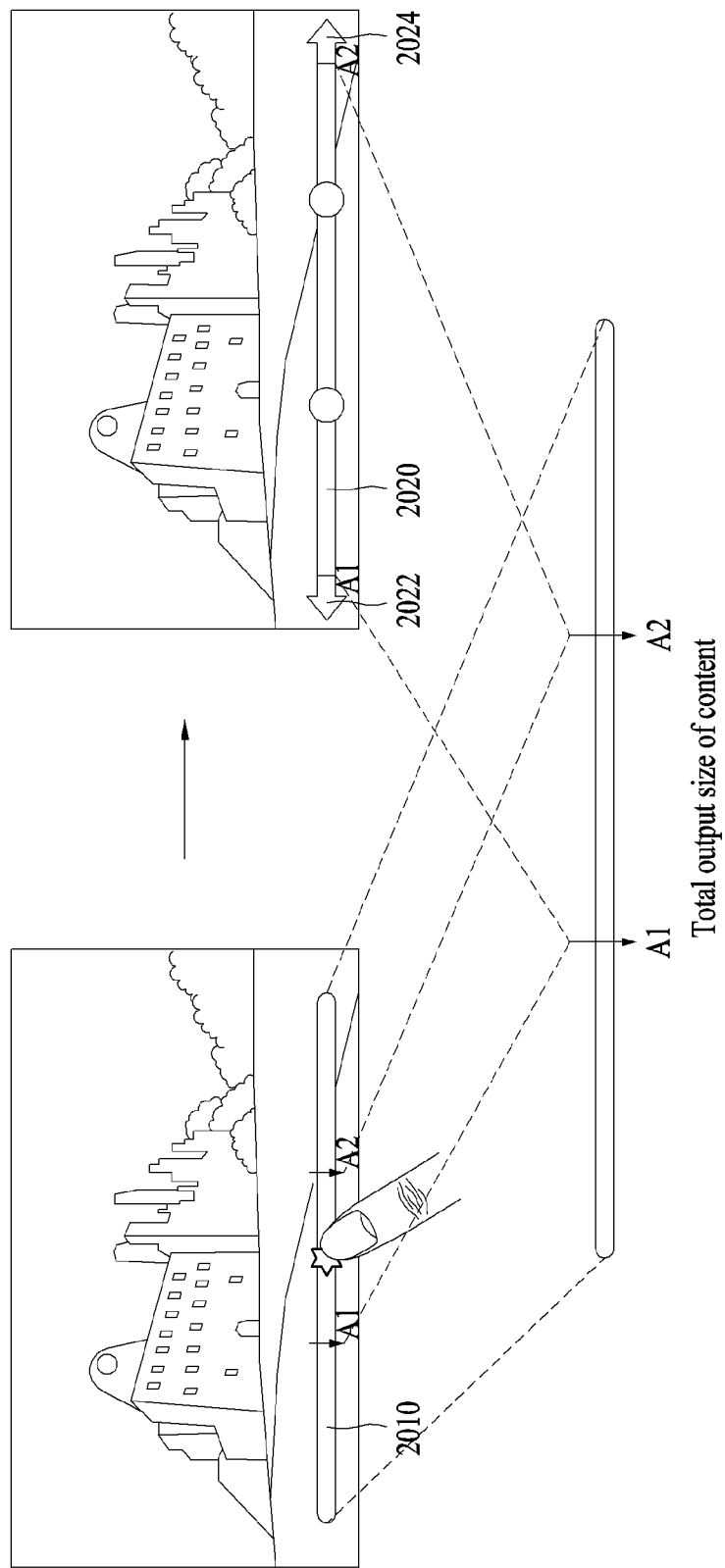
FIG. 20 is a diagram illustrating one example to describe that an intelligent scroll bar is displayed by enlarging a partial interval of a normal scroll bar.

FIG. 20 is a diagram illustrating one example to describe that an intelligent scroll bar is displayed by enlarging a partial interval of a normal scroll bar. Referring to FIG. 20, if a user input for changing a normal scroll bar 2101 into an intelligent scroll bar 2020 is applied, the controller 180 can display the intelligent scroll bar 2020 by extending a partial interval of the normal scroll bar 2010. In the example shown in FIG. 20, an interval searchable through the intelligent scroll bar 2020 corresponds to a partial interval A1-A2 of the normal scroll bar 2010.

In the example shown in FIG. 20, if a left arrow 2022 of the intelligent scroll bar 2020 or a right arrow 2024 of the intelligent scroll bar 2020 is touched, the controller 180 can change the searchable interval of the intelligent scroll bar 2020. In the example shown in FIG. 20, if the scroll bar 2020 is displayed by enlarging the partial interval of the normal scroll bar 2010, it can facilitate a more sophisticated adjustment using the intelligent scroll bar 2020.

In the example shown in FIG. 4, depending on whether the pointer 10 touching the random point of the scroll bar moves in a prescribed direction, either the operation according to the step S405 or the operation according to the step S406 can be selectively performed. However, it may not be necessary for both of the step S405 and the step S406 to be performed in order to implement the present invention. Hence, while the step S404 and the step S405 are skipped, the step S406 is performed or skipped after the step S403.

According to the above-described embodiments, a significant output point is displayed by a marker displayed on an intelligent scroll bar for example. A mobile terminal according to one embodiment of the present invention can display a significant output point by controlling summary information of the significant output point to be output to the touchscreen instead of displaying a marker on a scroll bar or together with the marker.

Figure 21:
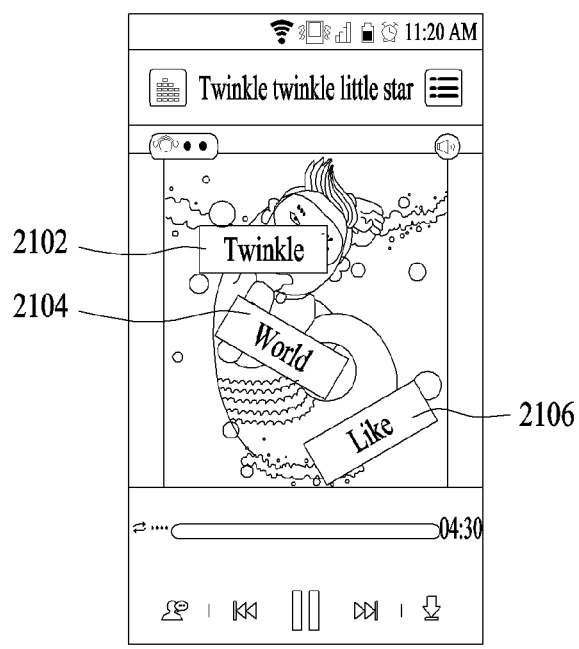
FIG. 21 is a diagram illustrating one example to describe that a summary information of a significant output point is displayed on a touchscreen.

For instance, if a timing point of outputting a specific word of lyrics of a music file is set as a significant output point, referring to FIG. 21, the controller 180 can display specific words 2102, 2104 and 2106 on behalf of significant output points. FIG. 21 is a diagram illustrating one example to describe that summary information of a significant output point is displayed on a touchscreen. Referring to FIG. 21, if a prescribed specific word is selected from a plurality of specific words 2102, 2104 and 2106, the controller 180 can change a play timing point of a music file into a significant output point indicated by the selected specific word, i.e., a timing point of outputting the selected specific word as a lyric.

Besides the specific words 2102, 2104 and 2106 shown in FIG. 21, the controller 180 can handle time information, chapter information, page information or the like, which corresponds to a significant output point, as a summary information of the significant output point. In doing so, a display position of the summary information of the significant output point can be randomly determined.

According to the above-described embodiments, in order to identify a significant output point, a marker indicating the significant output point is displayed on a scroll bar. The mobile terminal sets up a significant output point, determines a significant output interval, and controls the significant output interval to be identifiably displayed. In this instance, the significant output interval may include an interval determined by two significant output points. In addition, start and end points for defining the significant output interval can be designated or released by a user.

Figure 22C:
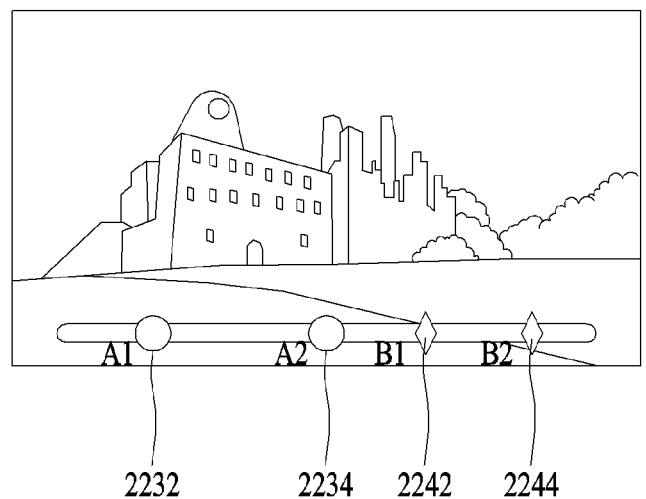

For instance, FIGS. 22A to 22C are diagrams illustrating one example to describe a process for setting a significant output interval. Referring to FIG. 22A, if a pointer 10 touching a timing point A1 of a scroll bar moves in a first direction vertical to the scroll bar, the controller 180 can set the timing point A1 as a start point of a significant output interval.

Subsequently, if the pointer 10 touching a timing point A2 moves in a second direction vertical to the scroll bar moves in a second direction vertical to the scroll bar, the controller 180 can set the timing point A2 as an end point of the significant output interval.

In order to identify the start and end points of the significant output interval, referring to FIG. 22A and FIG. 22B, the controller 180 can control a marker 2210 displayed at the start point and a marker 2220 displayed at the end point to be visually identified. When a plurality of significant output intervals exist on an intelligent scroll bar, in order to identify each of a plurality of the significant output intervals, referring to FIG. 22C, the controller 180 can control shapes of markers defining each significant output interval to be visually identifiable. In particular, in FIG. 22C, an interval A1-A2 defined by the markers 2232 and 2234 in the oval shape and an interval B1-B2 defined by the markers 2242 and 2244 in the diamond shape are defined as significant output intervals, respectively.

Although a significant output interval exists, the steps S403 to S406 mentioned in the forgoing description with reference to FIG. 4 are exactly applicable. For instance, if the pointer 10 touching a random point of a scroll bar moves in a prescribed direction parallel with the scroll bar, the controller 180 can control a significant output interval, which is defined by markers closest to the touch point among markers placed onto a moving direction of the pointer 10, to be output. When a significant output interval of a content is set to be played, the controller 180 can control the significant output interval to be repeatedly played in response to a user's touch input.

When adding a webpage to bookmarks, the mobile terminal according to an embodiment of the present invention can control the corresponding webpage to be saved by being linked to a location information. In this instance, the location information may include location information of an output indicator on a scroll bar on adding the webpage to the bookmarks or an interval, in which a user inputs a memo, of the webpage added to the bookmarks.

Subsequently, if the webpage including the location information is selected from a bookmark list, the controller 180 displays the selected webpage and also controls a part matching the location information to be output. This is described in detail with reference to FIG. 23 and FIG. 24 as follows.

Figure 23:
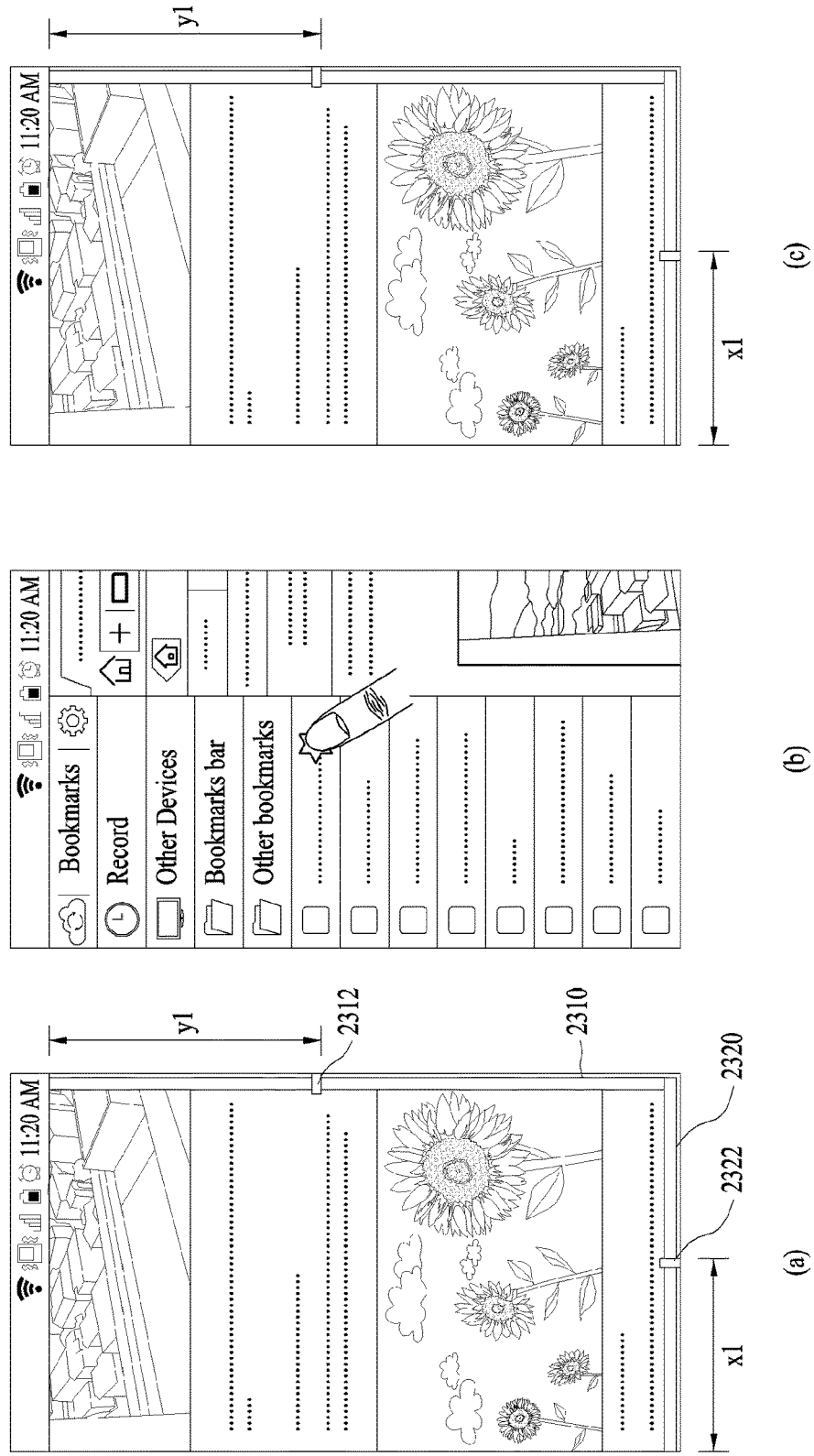
FIG. 23 is a diagram illustrating one example to describe an operation When a webpage is added to bookmarks in a mobile terminal according to an embodiment of the present invention.

FIG. 23 is a diagram illustrating one example to describe an operation when a webpage is added to bookmarks in a mobile terminal according to an embodiment of the present invention. Referring to FIG. 23, if a webpage has a size greater than that outputtable through the touchscreen, the controller can control the webpage to be scrolled up/down or right/left in response to a user input. When the webpage is scrolled up and down, the controller 180 can control a currently output part of the webpage to be recognized by a user by adjusting an output indicator 2312 of a vertical scroll bar 2310 shown in FIG. 23($a$). When the webpage is scrolled right and left, the controller 180 can control a currently output part of the webpage to be recognized by a user by adjusting a location of an output indicator 2322 of a horizontal scroll bar 2320 shown in FIG. 23($a$).

When a webpage is added to bookmarks, the mobile terminal according to an embodiment of the present invention can control a webpage address to be saved by being linked to a location information of an output indicator on a scroll bar. For instance, in the example shown in FIG. 23(a), since the output indicator 2322 on the horizontal scroll bar 2320 is spaced apart from a start point by x1 and the output indicator 2312 on the vertical scroll bar 2310 is spaced apart from the start point by y1, the controller 180 can control the webpage and the coordinates information (e.g., (x1, y1), etc.) of the output indicators 2322 and 2312 to be saved by being linked to each other.

Because a horizontal width of the webpage is equal to a width of the touchscreen, if the horizontal scroll bar 2320 is not necessary, the controller 180 may control the coordinates information (e.g., (0, y1)) of the output indicator 2312 on the vertical scroll bar 2310 to be saved by being linked to the webpage.

Subsequently, if the webpage including the location information is selected from the bookmark list (FIG. 23(b)), the controller 180 can control a part matching the location information to be output while displaying the selected webpage (FIG. 23(c)). In particular, in the example shown in FIGS. 23(a) to 23(c), the mobile terminal according to an embodiment of the present invention can control an output part on adding the webpage to the bookmarks to be exactly displayed using the location information saved by being linked to the webpage.

Figure 24:
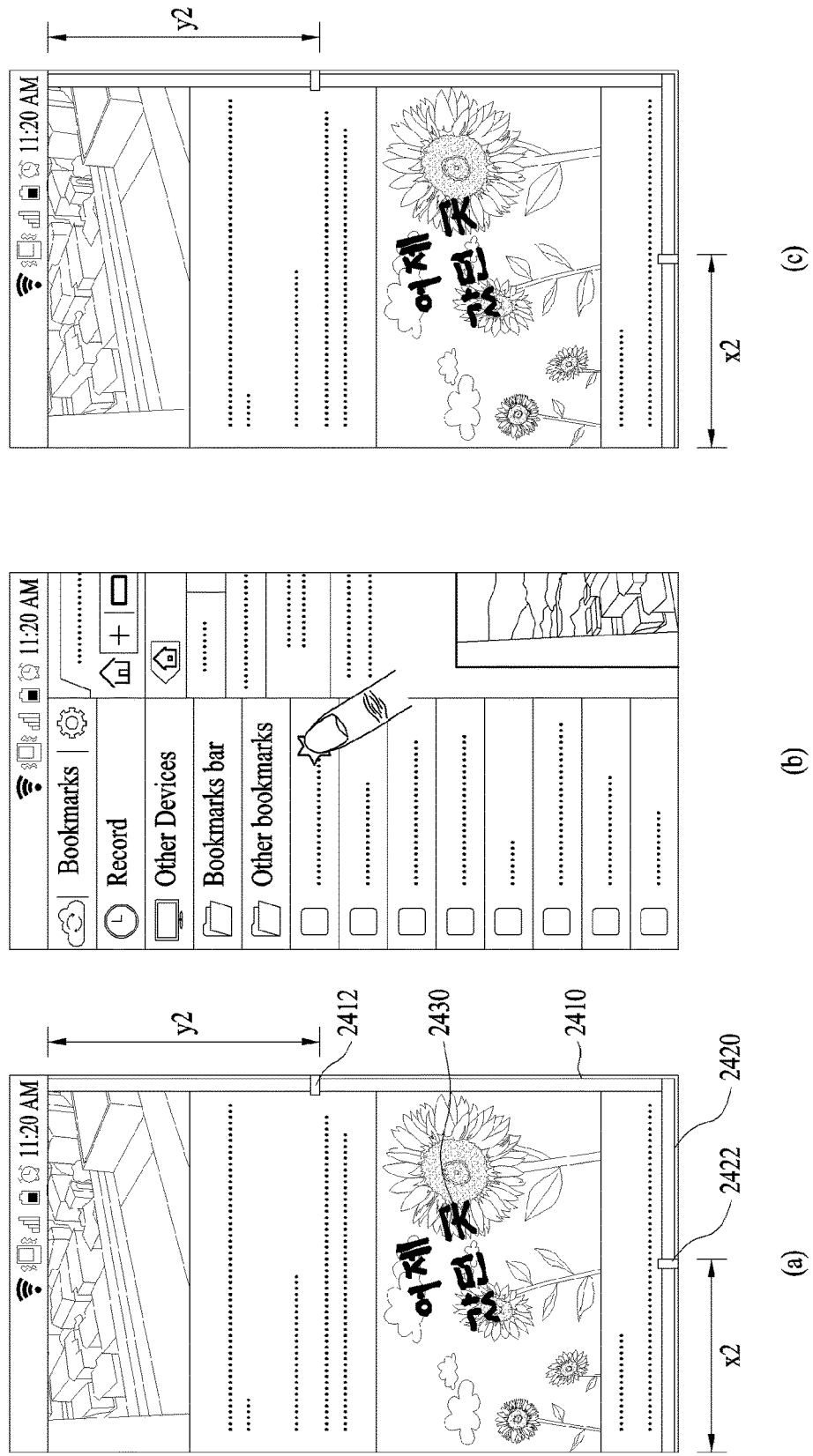
FIG. 24 is a diagram illustrating another example to describe an operation When a webpage is added to bookmarks in a mobile terminal according to an embodiment of the present invention.

FIG. 24 is a diagram illustrating another example to describe an operation when a webpage is added to bookmarks in a mobile terminal according to an embodiment of the present invention. Referring to FIG. 24, while a user is reading a webpage, a user can insert a memo by underlining a necessary part or inputting a handwriting. If the memo inserted webpage is added to bookmarks, the controller 180 can control a location information, which is provided to display the memo added to the webpage, to be saved by being linked to the webpage. For instance, referring to FIG. 24(a), if coordinates of output indicators 2412 and 2422 for displaying the memo 2430 included in the webpage are (x2, y2), the controller 180 can control the coordinates information of the output indicators 2412 and 2422 to be saved by being linked to the webpage.

Because a horizontal width of the webpage is equal to a width of the touchscreen, if the horizontal scroll bar 2420 is not necessary, the controller 180 may control the coordinates information (e.g., (0, y2)) of the output indicator 2412 on the vertical scroll bar 2310 to be saved by being linked to the webpage.

Subsequently, if the webpage including the location information is selected from the bookmark list (FIG. 24(b)), the controller 180 can control a part matching the location information to be output while displaying the selected webpage (FIG. 24(c)). Hence, referring to FIG. 24(c), the memo added to the webpage can be displayed together with the webpage on the touchscreen.

In FIG. 23(b) or FIG. 24(b), a list of webpages added to bookmarks is displayed on the basis of text. Unlike the examples shown in FIG. 23(b) and FIG. 24(b), the mobile terminal according to an embodiment of the present invention can control a list of webpages added to bookmarks to be displayed on a scroll bar. This is described in detail with reference to FIG. 25 as follows.

Figure 25:
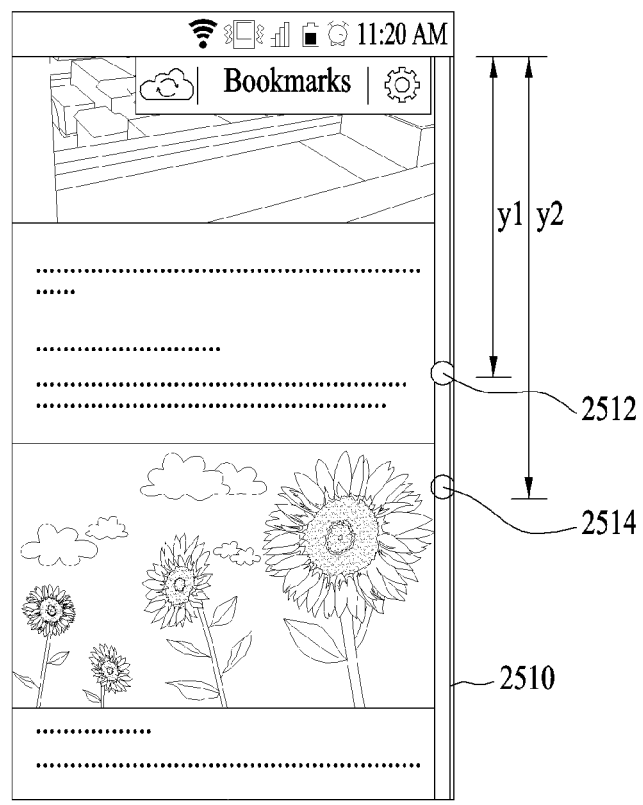
FIG. 25 is a diagram illustrating one example to describe that a list of webpages added to bookmarks is displayed through a scroll bar.

FIG. 25 is a diagram illustrating one example to describe that a list of webpages added to bookmarks is displayed through a scroll bar. Referring to FIG. 25, the controller 180 can display a list of webpages added to bookmarks on a scroll bar using a location information included in each webpage. In the example shown in FIG. 25, a marker displayed on a scroll bar 2510 may indicates a webpage added to bookmarks. In this instance, a location of each marker may correspond to the location information included in each webpage.

In particular, in the example shown in FIG. 25, a marker 2512 spaced apart from a start point by y1 may indicate a webpage having a vertical axis value set to y1 in coordinate values of the location information. In addition, a marker 2514 spaced apart from the start point by y2 may indicate a webpage having a vertical axis value set to y2 in coordinate values of the location information.

Like the example shown in FIG. 25, if a marker is displayed on a scroll bar, the steps S403 to S406 mentioned in the description with reference to FIG. 4 may be exactly applicable. In particular, if a pointer 10 touching a random point of the scroll bar moves in a prescribed direction parallel with the scroll bar, the controller 180 can control a webpage, which is indicated by a marker closest to the touch point among markers placed onto the moving direction of the pointer 10, to be output. In doing so, as mentioned in the foregoing description with reference to FIG. 23 and FIG. 24, it can consider a location information of a webpage to output.

As mentioned in the foregoing description with reference to FIG. 17, if a pointer 10 touching a random point of a scroll bar is released from a corresponding contact instead of moving in a prescribed direction, the controller 180 can control a webpage, which is indicated by a marker located closest to a corresponding touch point, to be output.

Accordingly, embodiments of the present invention provide several advantages. According to at least one of embodiments of the present invention, user's convenience can be enhanced. In particular, the present invention enables a user to adjust an output of a content into a significant output point easily and conveniently if the significant output point is set.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit configured to perform wireless communication;
a touchscreen configured to display content; and
a controller configured to:
display a scroll bar on the touchscreen for adjusting an output location of the content,
display a plurality of markers on the scroll bar to indicate a specific output location of the content,
receive a first user input touching the content currently displayed on the touchscreen, display a first marker on the scroll bar in response to the first user input, wherein the first marker indicates an output location of the content, receive a second user input, wherein the second user input corresponds to the touching a predetermined point of the scroll bar and then dragging in a first direction perpendicular to the scroll bar, display a second marker at the predetermined point on the scroll bar corresponding to the second user input, receive a third user input, wherein the third user input corresponds to the touching the second marker and dragging in a second direction perpendicular to the scroll bar, wherein the second direction is opposite with the first direction, delete the second marker corresponding to the third user input, output a second point of the content corresponding to a third marker which is closest to a first point among markers laid along a third direction from the first point if a pointer touching the first point on the scroll bar is released after moving in the third direction, and output a third point of the content corresponding to a fourth marker which is closest to the first point among markers laid along a fourth direction from the first point if the pointer touching the first point on the scroll bar is released after moving in the fourth direction.

2. The mobile terminal of claim 1, wherein the third and fourth directions are parallel with the scroll bar.

3. The mobile terminal of claim 1, wherein the controller is further configured to:
receive a selection signal indicating the content currently displayed on the touchscreen is touched, and
display a marker, which indicates an output location of the content when the currently displayed content is touched, on the scroll bar.

4. The mobile terminal of claim 1, wherein the controller is further configured to change at least one of a color and a shape of at least one of the markers.

5. The mobile terminal of claim 4, wherein the controller is further configured to selectively display the at least one of the markers corresponding to a specific shape or a specific color based on a predetermined input.

6. The mobile terminal of claim 1, wherein the controller is further configured to display the markers on the scroll bar in unit intervals.

7. The mobile terminal of claim 1, wherein one of said plurality of markers indicates a point at which a memo was added to the content.

8. The mobile terminal of claim 1, wherein if the content includes a plurality of chapters, the controller is further configured to display a marker at a start point of each chapter on the scroll bar.

9. The mobile terminal of claim 1, wherein if the pointer touching the first point is released from a contact without moving in any direction, the controller is further configured to change the output location of the content to the first point.

10. The mobile terminal of claim 1, wherein if the pointer touching the first point is released from a contact without moving in any direction, the controller is further configured to change the output location of the content to an output location indicated by a marker located closest to the first point.

11. The mobile terminal of claim 1, wherein the controller is further configured to provide feedback indicating the output location of the content is changed into the output location indicated by a marker of said plurality of markers.

12. The mobile terminal of claim 11, wherein the feedback includes at least one of vibration, sound and LED lightning.

13. A method of controlling a mobile terminal, the method comprising:
displaying, via a touchscreen of the mobile terminal, content;
displaying, via a controller of the mobile terminal, a scroll bar on the touchscreen for adjusting an output location of the content;
displaying, via the controller, a plurality of markers on the scroll bar to indicate a specific output location of the content;
receiving, via the controller, a first user input touching the content currently displayed on the touchscreen;
displaying, via the controller, a first marker on the scroll bar in response to the first user input, wherein the first marker indicates an output location of the content;
receiving, via the controller, a second user input, wherein the second user input corresponds to the touching a predetermined point of the scroll bar and then dragging in a first direction perpendicular to the scroll bar;
displaying, via the controller, a second marker at the predetermined point on the scroll bar corresponding to the second user input;
receiving, via the controller, a third user input, wherein the third user input corresponds to the touching the second marker and dragging in a second direction perpendicular to the scroll bar, wherein the second direction is opposite with the first direction;
deleting, via the controller, the second marker corresponding to the third user input;
outputting a second point of the content corresponding to a third marker which is closest to a first point among markers laid along a third direction from the first point if a pointer touching the first point on the scroll bar is released after moving in the third direction; and
outputting a third point of the content corresponding to a fourth marker which is closest to the first point among markers laid along a fourth direction from the first point if the pointer touching the first point on the scroll bar is released after moving in the fourth direction.

14. The method of claim 13, wherein the third and fourth directions are parallel with the scroll bar.

15. The method of claim 13, further comprising:
receiving a selection signal indicating the content currently displayed on the touchscreen is touched; and
displaying a marker, which indicates an output location of the content when the currently displayed content is touched, on the scroll bar.

16. The method of claim 13, further comprising:
changing at least one of a color and a shape of at least one of the markers; and
selectively displaying the at least one of the markers corresponding to a specific shape or a specific color based on a predetermined input.

* * * * *